(12) United States Patent
Satoh et al.

(10) Patent No.: US 6,197,477 B1
(45) Date of Patent: Mar. 6, 2001

(54) OPTICAL RECORDING MEDIUM

(75) Inventors: Tsutomu Satoh; Shohji Maruyama; Yasunobu Ueno, all of Yokohama; Tatsuya Tomura, Tokyo; Noboru Sasa; Yasuhiro Higashi, both of Yokohama, all of (JP)

(73) Assignee: Ricoh Company, LTD, Tokyo (JP)

( * ) Notice: Subject to any disclaimer, the term of this patent is extended or adjusted under 35 U.S.C. 154(b) by 0 days.

(21) Appl. No.: 09/376,197

(22) Filed: Aug. 18, 1999

(30) Foreign Application Priority Data

Aug. 18, 1998 (JP) .................................................. 10-247867
Jun. 17, 1999 (JP) .................................................. 11-170708

(51) Int. Cl.$^7$ ..................................................... G11B 7/24
(52) U.S. Cl. .................. 430/270.16; 430/945; 428/64.8; 369/288; 534/707; 534/723
(58) Field of Search .............................. 430/270.16, 945; 428/64.8; 369/288; 534/707, 723, 713

(56) References Cited

U.S. PATENT DOCUMENTS

| | | | |
|---|---|---|---|
| 4,714,667 | 12/1987 | Sato et al. | 430/945 |
| 4,735,839 | 4/1988 | Sato et al. | 430/945 |
| 4,737,444 | 4/1988 | Satoh et al. | 430/945 |
| 4,767,693 | 8/1988 | Oba et al. | 430/945 |
| 4,891,305 | 1/1990 | Oba et al. | 430/945 |
| 5,002,812 | 3/1991 | Umehara et al. | 369/288 |
| 5,028,467 | 7/1991 | Maruyama et al. | 430/945 |
| 5,085,909 | 2/1992 | Satoh et al. | 369/288 |
| 5,149,819 | 9/1992 | Satoh et al. | 548/149 |
| 5,256,794 | 10/1993 | Satoh et al. | 548/491 |
| 5,260,165 | 11/1993 | Satoh et al. | 430/945 |
| 5,447,823 * | 9/1995 | Ochai et al. | 430/270.16 |
| 5,510,229 | 4/1996 | Satoh et al. | 430/270.18 |
| 5,863,703 | 1/1999 | Tomura et al. | 430/270.16 |
| 6,057,020 * | 5/2000 | Ueno et al. | 430/270.16 |

FOREIGN PATENT DOCUMENTS

| | | |
|---|---|---|
| 0188001 | 7/1986 | (EP) . |
| 0755052 | 1/1997 | (EP) . |
| 0844243 | 5/1998 | (EP) . |
| 0981132 * | 8/1999 | (EP) . |
| 11-020317 * | 1/1999 | (JP) . |

* cited by examiner

Primary Examiner—Martin Angebranndt
(74) Attorney, Agent, or Firm—Cooper & Dunham LLP

(57) ABSTRACT

An optical recording material including a substrate and a recording layer which is formed overlying the substrate, wherein the recording layer includes an azo chelate compound including an azo compound and at least one of a metal and a metal salt, and wherein the azo compound has the following formula (1):

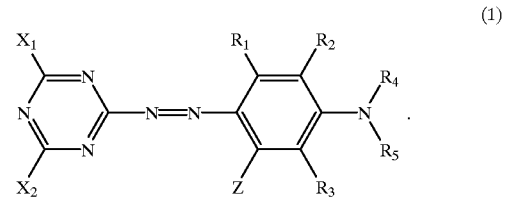

16 Claims, 4 Drawing Sheets

OPTICAL RECORDING MEDIUM

BACKGROUND OF THE INVENTION

1. Field of the Invention

The present invention relates to a high-capacity optical recording medium for storing data, and more particularly to a recordable high-capacity optical disc such as recordable high-capacity compact discs and recordable digital video discs.

2. Discussion of the Related Art

Currently, DVD-Rs (digital video disc-recordable) have been developed as next-generation high-capacity optical discs. In order to increase the recording capacity of DVD-Rs, the following technologies are needed:

(1) recording materials in which relatively small recording pits can be formed;

(2) advanced image compression technologies such as MPEG2 (Motion Picture Experts Group); and (3) a laser diode emitting light having a relatively short wavelength for reading relatively small pits.

As for the laser diodes emitting light in the red region, only AlGaInP laser diodes, which emit light having a wavelength of 670 nm, have been developed for commercial operation and used for bar code readers and measuring instruments. With the capacity of optical discs increased, red color laser diodes have been used in the optical data storage field. In a case of DVD drives, light within the 635 nm band or 650 nm band, which is emitted by laser diodes, is standardized as a light source. In order to perform high-density recording, it is desirable for the light used for high-density recording to have as short a wavelength as possible. Therefore, the light having a wavelength of 635 nm is preferably used for drives for recording information in recordable optical media. In contrast, as for the read-only DVD-ROM (digital video disc-read-only-memory) drives, drives using light having a wavelength of 650 nm are marketed.

Until now, the following write-once read-many-times information recording media (WORM) have been proposed:

(1) recording media using a cyanine dye as a recording material, which have been disclosed in Japanese Laid-Open Patent Publications Nos. 57-82093, 58-56892, 58-112790, 58-114989, 59-85791, 60-83236, 60-89842 and 61-25886;

(2) recording media using a phthalocyanine dye as a recording material, which have been disclosed in Japanese Laid-Open Patent Publications Nos. 61-150243, 61-177287, 61-154888, 61-24609, 62-39286, 63-37991 and 63-39888;

The following background art concerning recordable compact discs (CD-Rs) has been proposed:

(1) recording media using a cyanine dye and a light reflective metal layer as a recording material, which have been disclosed in Japanese Laid-Open Patent Publications Nos. 1-159842, 2-42652, 2-13656 and 2-168446;

(2) recording media using a phthalocyanine dye and a light reflective metal layer as a recording material, which have been disclosed in Japanese Laid-Open Patent Publications Nos. 1-176585, 3-215446, 4-113886, 4-226390, 5-1272, 5-171052, 5-116456, 5-96860 and 5-139044; and (3) recording media using an azo chelate dye and a light reflective metal layer as a recording material, which have been disclosed in Japanese Laid-Open Patent Publications Nos. 4-46186, 4-141489, 4-361088, 5-279580, 7-51673, 7-161069, 7-37272, 7-71867, 8-231866, 8-295811, 9-277703, and 10-36693.

In addition, the following background art concerning recordable compact discs (CD-Rs), which can perform only reproduction in DVD system, has been proposed:

(1) recording media using a combination of a CD-R recording material with an azo dye capable of absorbing light having a relatively short wavelength as a recording material, which have been disclosed in Japanese Laid-Open Patent Publications Nos. 8-156408, 8-310121, 9-39394 and 9-40659;

(2) recording media using a combination of a CD-R recording material with an azaannulene dye capable of absorbing light having a relatively short wavelength as a recording material, which have been disclosed in Japanese Laid-Open Patent Publications Nos. 8-276662 and 8-287513; and (3) recording media using a combination of a CD-R recording material with another dye capable of absorbing light having a relatively short wavelength as a recording material, which have been disclosed in Japanese Laid-Open Patent Publications Nos. 8-169182, 8-310129 and 8-324117.

Further, the following background art concerning recordable high-capacity compact discs (DVD-Rs) has been proposed:

(1) recording media using a cyanine dye and a light reflective metal layer as a recording material; and (2) recording media using an imidazole type azomethine dye and a light reflective metal layer as a recording material, which have been disclosed in Japanese Laid-Open Patent Publications Nos. 8-198872, 8-209012 and 8-283263.

Under such circumstances, a medium, which can record and reproduce information with light having a wavelength of 635 nm and in addition can reproduce information with light having a wavelength of 650 nm, are most preferable as the DVD-R media. However, a DVD-R medium, which can record and reproduce information with an optical pickup using light having a wavelength not greater than 650 nm and which has good light resistance and good preservability, has not yet been developed.

The current CD-R disc systems are designed so that record and reproduction can be performed by laser light having a wavelength of from 770 nm to 790 nm. On the other hand, since CD-Rs use in the recording layer thereof a dye having maximum absorption in a wavelength range of from 680 nm to 750 nm and are designed so as to have high reflectivity against light in a wavelength range of from 770 nm to 790 nm by controlling their optical constants and layer thickness, CD-Rs have very poor reflectivity against light having a wavelength not greater than 700 nm. Therefore, a problem tends to occur in that information, which is recorded in a CD-R by the current CD-R systems and which can be reproduced by the CD-R systems, cannot be reproduced by DVD-R disc systems.

Because of these reasons, a need exists for an optical recording medium in which information can be recorded and reproduced by DVD-R disc systems and which has good light resistance and good preservability.

SUMMARY OF THE INVENTION

Accordingly, an object of the present invention is to provide an optical recording medium which has good light resistance and good preservability and which can be used in DVD-R disc systems using a laser diode emitting light having a relatively short wavelength.

Another object of the present invention is to provide an optical recording medium in which information recorded in the optical recording medium by CD-R disc systems can be reproduced by DVD-R disc systems.

To achieve such objects, the present invention contemplates the provision of an optical recording material which has a substrate and a recording layer which is formed overlying the substrate, wherein the recording layer includes an azo chelate compound including an azo compound and at least one of a metal and a metal salt and wherein the azo compound has the following formula (1):

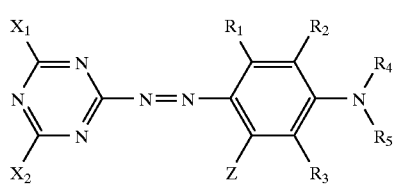
(1)

wherein R1–R3 independently represent a hydrogen atom, a halogen atom, a nitro group, a cyano group, a hydroxy group, a carboxyl group, an amino group, a carbamoyl group, an alkyl group which may be substituted, an aryl group which may be substituted, a heterocyclic group which may be substituted, an alkyloxy group which may be substituted, an aryloxy group which may be substituted, an alkylamino group which may be substituted, an arylamino group which may be substituted, an alkyloxycarbonyl group which may be substituted, an aryloxycarbonyl group which may be substituted, an alkylcarbonylamino group which may be substituted, an arylcarbonylamino group which may be substituted, an alkylcarbamoyl group which may be substituted, an arylcarbamoyl group which may be substituted, or an alkenyl group which may be substituted; R4 and R5 independently represent a hydrogen atom, an alkyl group which may be substituted, or aryl group which may be substituted, wherein R1 and R2, R2 and R4 or R5, R3 and R4 or R5, and R4 and R5 may combine to form a ring; X1 represents R6 or SR7, wherein R6 represents a hydrogen atom, a halogen atom, a nitro group, a cyano group, a hydroxy group, a carboxyl group, an alkyl group which may be substituted, a phenyl group which may be substituted, an alkoxy group which may be substituted, an aryloxy group which may be substituted, a carbamoyl group which may be substituted, an acyl group which may be substituted, an alkoxycarbonyl group which may be substituted, an aryloxycarbonyl group which may be substituted, an alkenyl group which may be substituted, or an amino group which may be substituted; and R7 represents a hydrogen atom, an alkyl group which may be substituted, or an aryl group which may be substituted; X2 represents R8, SR9, OR10 or NR11R12, wherein R8 represents the same groups as mentioned above for use as R6, R9 represents an alkyl group which may be substituted, and R10, R11 and R12 independently represent an alkyl group which may be substituted, or an aryl group which may be substituted; and Z represents a group having active hydrogen.

Preferably, Z is a group selected from the group consisting of a hydroxy group and its derivatives, a carboxyl group and its derivatives, an amino group and its derivatives, a sulfo group and its derivatives, an amide group NHX3 in which X3 represents COR13 in which R13 represents an alkyl group which may be substituted or an aryl group which may be substituted, and a sulfonamide group NHX4 in which X4 represents SO2R14 in which R13 represents an alkyl group which may be substituted or an aryl group which may be substituted.

In addition, the metal of the azo chelate compound is preferably a metal selected from the group consisting of manganese, chromium, iron, cobalt, nickel and copper.

These and other objects, features and advantages of the present invention will become apparent upon consideration of the following description of the preferred embodiments of the present invention taken in conjunction with the accompanying drawings.

DESCRIPTION OF THE PREFERRED EMBODIMENTS

Figure 1:
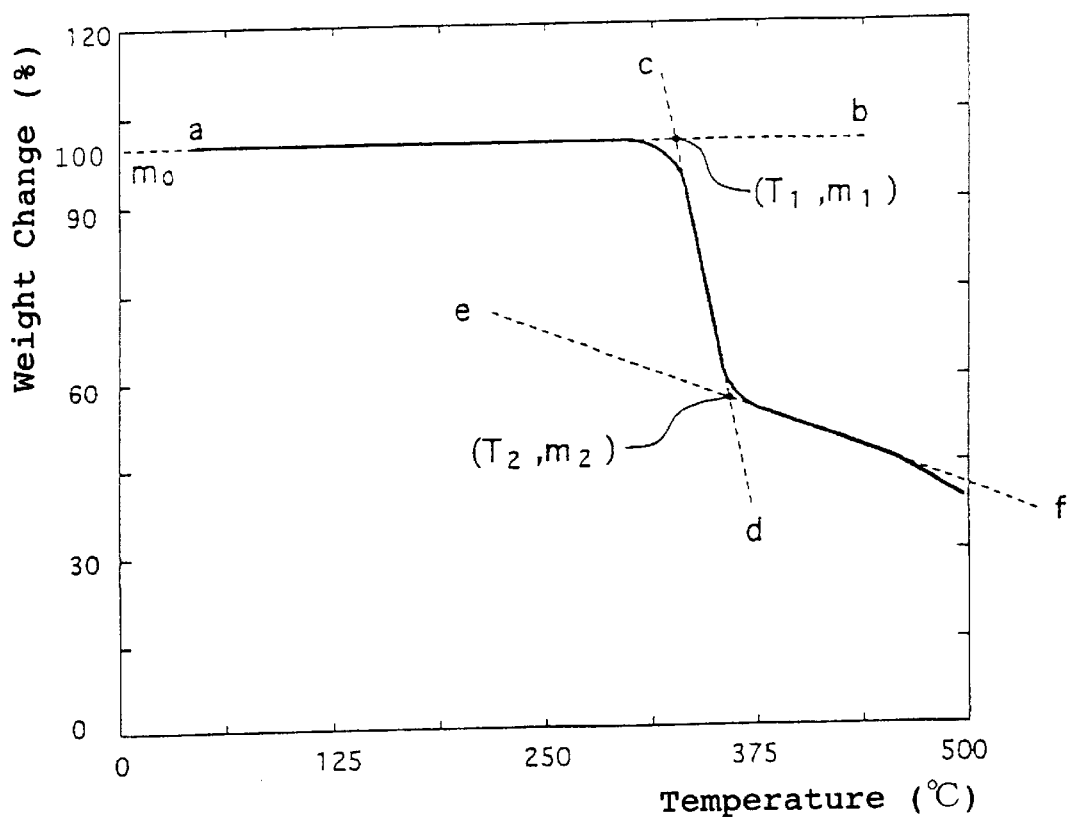
FIG. 1 is a graph illustrating a weight changing curve of an organic compound when the organic compound is heated.
Figure 2A:
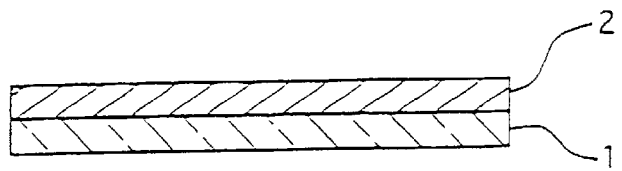
FIGS. 2A–2D are schematic diagrams illustrating sectional views of typical recordable optical media.
Figure 2B:
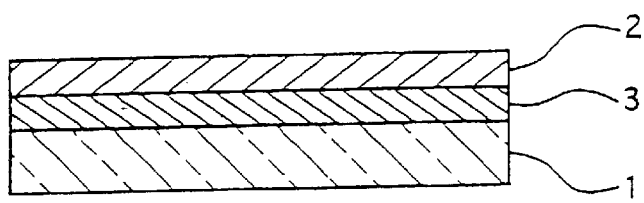
Figure 2C:
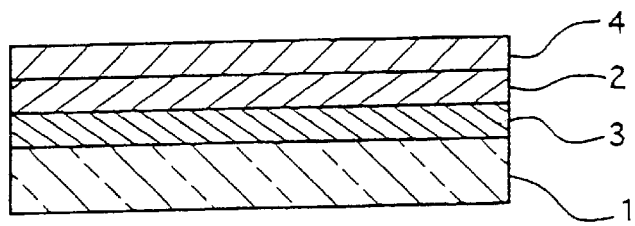
Figure 2D:
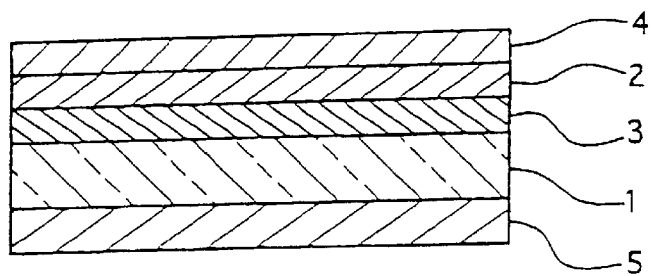

As a result of the present inventors' examination, an optical recording medium, which is useful for the next-generation high-capacity disc systems using a laser diode emitting light having a wavelength not greater than 700 nm, can be provided by forming a recording layer mainly including a dye having a specific structure. In addition, it is also discovered that by using a mixture of the specific dye with an organic dye which has been used for the current CD-Rs, an optical recording medium can be obtained, which can be used for the current CD-R systems and in which information can be reproduced by DVD-R systems because of having high reflectivity against light having a wavelength not greater than 700 nm.

In the optical recording medium of the present invention, dyes having the following formula (1) are used.

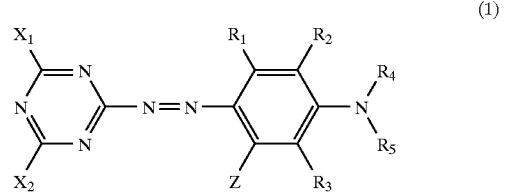
(1)

Among these dyes, dyes having the following formula (2) or (3) are preferably used.

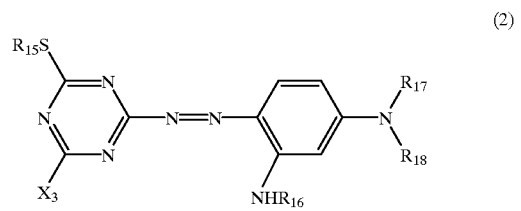
(2)

wherein R15 represents a phenyl group which may be substituted; R17 and R18 independently represent a hydrogen atom, an alkyl group having 1 to 6 carbon atoms which may be substituted, or a phenyl group which may be substituted, wherein R17 and R18 may combine to form a ring; X3 represents OR19 or NR20R21, wherein R19, R20 and R21 independently represent an alkyl group having 1 to 6 carbon atoms which may be substituted, or a phenyl group which may be substituted; and R16 represents COR22 or SO$_2$R23, wherein R22 and R23 independently represent an alkyl group which may be substituted, or an aryl group which may be substituted.

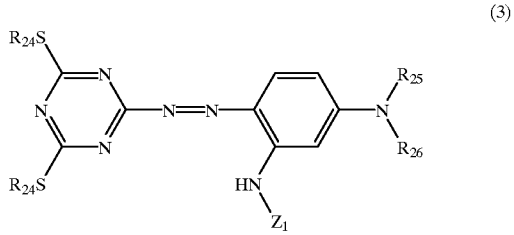

(3)

wherein R24 represent an alkyl group which may be substituted, or a phenyl group which may be substituted; R25 and R26 independently represent a hydrogen atom, an alkyl group which may be substituted, or an aryl group which may be substituted, wherein R25 and R26 may combine to form a ring; and Z1 represents COR27 or SO$_2$R28, wherein R27 and R28 independently represent an alkyl group which may be substituted, or an aryl group which may be substituted.

In formulae (1), (2) and (3), specific examples of the alkyl groups include primary alkyl groups such as amethyl group, an ethyl group, a n-propyl group, a n-butyl group, a n-pentyl group, a n-hexyl group, a n-heptyl group, a n-octyl group, a n-nonyl group, and a n-decyl group; secondary alkyl groups such as an isobutyl group, an isoamyl group, a 2-methylbutyl group, a 2-methylpentyl group, a 3-methylpentyl group, a 4-methylpentyl group, a 2-ethylbutyl group, a 2-methylhexyl group, a 3-methylhexyl group, a 4-methylhexyl group, a 5-methylhexyl group, a 2-ethylpentyl group, a 3-ethylpentyl group, a 2-methylheptyl group, a 3-methylheptyl group, a 4-methylheptyl group, a 5-methylheptyl group, a 2-ethylhexyl group, a 3-ethylhexyl group, an isopropyl group, a sec-butyl group, a 1-ethylpropyl group, a 1-methylbutyl group, a 1,2-dimethylpropyl group, a 1-methylheptyl group, a 1-ethylbutyl group, a 1,3-dimethylbutyl group, a 1,2-dimethylbutyl group, a 1-ethyl-2-methylpropyl group, a 1-methylhexyl group, a 1-ethylheptyl group, a 1-propylbutyl group, a 1-isopropyl-2-methylpropyl group, a 1-ethyl-2-methylbutyl group, a 1-propyl-2-methylpropyl group, a 1-ethylhexyl group, a 1-propylpentyl group, a 1-isopropylpentyl group, a 1-isopropyl-2-methylbutyl group, a 1-isopropyl-3-methylbutyl group, a 1-methyloctyl group, a 1-ethylheptyl group, a 1-propylhexyl group, and a 1-isobutyl-3-methylbutyl group; tertiary alkyl groups such as a neopentyl group, a tert-butyl group, a tert-hexyl group, a tert-amyl group, and a tert-octyl group; and cycloalkyl groups such as a cyclohexyl group, a 4-methylcyclohexyl group, a 4-ethylcyclohexyl group, a 4-tert-butylcyclohexyl group, a 4-(2-ethylhexyl)cyclohexyl group, a bornyl group, and an isobornyl group (i.e., an adamantane group).

In addition, these primary and secondary alkyl groups may be substituted with a group such as a hydroxy group, a halogen atom, a nitro group, a carboxyl group, a cyano group, an aryl group, a substituted aryl group, a heterocyclic ring group, and a substituted heterocyclic ring group. Further, these primary and secondary alkyl groups may be substituted with one of the alkyl groups mentioned above with an atom such as oxygen, sulfur and nitrogen therebetween. Specific examples of such alkyl groups with an oxygen atom include a methoxymethyl group, a methoxyethyl group, an ethoxymethyl group, an ethoxyethyl group, a butoxyethyl group, an ethoxyethoxyethyl group, a phenoxyethyl group, a methoxypropyl group, an ethoxypropyl group, a piperidino group, and a morpholino group. Specific examples of such alkyl groups with a sulfur atom include a methylthioethyl group, an ethylthioethyl group, an ethylthiopropyl group, and a phenylthioethyl group. Specific examples of such alkyl groups with a nitrogen atom include a dimethylaminoethyl group, a diethylaminoethyl group, and a diethylaminopropyl group.

Specific examples of the aryl groups include a phenyl group, a naphthyl group, an anthranil group, a fluorenyl group, a phenalenyl group, a phenanthranil group, a triphenylenyl group, and a pyrenyl group. In addition, these aryl groups may be substituted with a hydroxy group, a halogen atom, a nitro group, a carboxyl group, a cyano group, an aryl group, a substituted aryl group, a heterocyclic ring group, and a substituted heterocyclic ring group. These aryl groups may be substituted with one of the alkyl groups mentioned above with an atom such as oxygen, sulfur and nitrogen therebetween.

Specific examples of the heterocyclic ring groups include a furyl group, a thienyl group, a pyrrolyl group, a benzofuryl group, an isobenzofuryl group, a benzothienyl group, an indolenyl group, an isoindolenyl group, a carbazolyl group, a pyridyl group, a piperidyl group, a quinolyl group, an isoquinolyl group, an oxazolyl group, an isooxazolyl group, a thiazolyl group, an isothiazolyl group, an imidazolyl group, a pyrazolyl group, a benzoimidazolyl group, a pyrazinyl group, a pyrimidyl group, a pyridazyl group, and a quinoxalinyl group. In addition, these aryl groups may be substituted with a hydroxy group, a halogen atom, a nitro group, a carboxy group, a cyano group, an aryl group, a substituted aryl group, a heterocyclic ring group, and a substituted heterocyclic ring group. Further, these aryl groups may be substituted with one of the alkyl groups mentioned above with an atom such as oxygen, sulfur and nitrogen therebetween.

Specific examples of the halogen atom include fluorine, chlorine, bromine and iodine.

Specific examples of the alkoxy groups include groups in which an alkyl group or a substituted alkyl group is directly connected with an oxygen atom. Specific examples of the alkyl groups and substituted alkyl groups include the alkyl groups mentioned above.

Specific examples of the alkyloxy groups include groups in which an alkyl group or a substituted alkyl group is directly connected with an oxygen atom. Specific examples of the alkyl groups and substituted alkyl groups include the alkyl groups mentioned above.

Specific examples of the aryloxy groups include groups in which an aryl group or a substituted aryl group is directly connected with an oxygen atom. Specific examples of the aryl groups and substituted aryl groups include the aryl groups mentioned above.

Specific examples of the carbamoyl groups include groups in which a hydrogen atom, an alkyl group, a substituted alkyl group, an aryl group, or a substituted aryl group is independently and directly connected with the nitrogen atom of a carbamoyl group (>NCO—). Specific examples of the alkyl groups, substituted alkyl groups, aryl groups and substituted aryl groups include the alkyl and aryl groups mentioned above.

Specific examples of the alkoxycarbonyl groups include groups in which an alkyl group or a substituted alkyl group is directly connected with the oxygen atom of an oxycarbonyl group (—OCO—). Specific examples of the alkyl groups and substituted alkyl groups include the alkyl groups mentioned above.

Specific examples of the acyl groups include groups in which an alkyl group or a substituted alkyl group, an aryl group or a substituted aryl group is directly connected with the carbonyl carbon atom of an acyl group (—CO—). Specific examples of the alkyl groups, substituted alkyl groups, aryl groups and substituted aryl groups include the alkyl groups and aryl groups mentioned above.

Specific examples of the alkylamino groups include groups in which an alkyl group or a substituted alkyl group is independently and directly connected with the nitrogen atom of an amino group (>N—). Specific examples of the alkyl groups and substituted alkyl groups include the alkyl and aryl groups mentioned above. In addition, the alkyl groups may combine to form a group having a ring such as a piperidino group, a morpholino group, a pyrrolidyl group, a piperazinyl group, an indolenyl group and isoindolenyl group.

Specific examples of the arylamino groups include groups in which an aryl group or a substituted aryl group is directly connected with the nitrogen atom of an amino group (>N—). Specific examples of the aryl groups and substituted aryl groups include the aryl groups mentioned above.

Specific examples of the amino groups include groups in which an alkyl group, a substituted alkyl group, an aryl group or a substituted aryl group is directly connected with the nitrogen atom of an amino group (>N—). Specific examples of the alkyl group, substituted alkyl groups, aryl groups and substituted aryl groups include the alkyl groups and aryl groups mentioned above.

Specific examples of the alkyloxycarbonyl groups include groups in which an alkyl group or a substituted alkyl group is directly connected with the oxygen atom of an oxycarbonyl group (—OCO—). Specific examples of the alkyl groups and substituted alkyl groups include the alkyl groups mentioned above.

Specific examples of the aryloxycarbonyl groups include groups in which an aryl group or a substituted aryl group is directly connected with the oxygen atom of an oxycarbonyl group (—OCO—). Specific examples of the aryl groups and substituted aryl groups include the aryl groups mentioned above.

Specific examples of the alkylcarbonylamino groups include groups in which an alkyl group or a substituted alkyl group is directly connected with the carbon atom of a carbonylamino group (—CONH—). Specific examples of the alkyl groups and substituted alkyl groups include the alkyl groups mentioned above.

Specific examples of the arylcarbonylamino groups include groups in which an aryl group or a substituted aryl group is directly connected with the carbon atom of a carbonylamino group (—CONH—). Specific examples of the aryl groups and substituted aryl groups include the aryl groups mentioned above.

Specific examples of the alkylcarbamoyl groups include groups in which an alkyl group or a substituted alkyl group is directly connected with the nitrogen atom of a carbamoyl group (>NCO—). Specific examples of the alkyl groups and substituted alkyl groups include the alkyl groups mentioned above. In addition, the alkyl groups may combine to form a group having a ring such as a piperidino group, a morpholino group, a pyrrolidyl group, a piperazinyl group, an indolenyl group and isoindolenyl group.

Specific examples of the arylcarbamoyl groups include groups in which an aryl group or a substituted aryl group is directly connected with the nitrogen atom of an carbamoyl group (>NCO—). Specific examples of the aryl groups and substituted aryl groups include the aryl groups mentioned above.

Specific examples of the heterocyclic ring groups include an indolyl group, a furyl group, a thienyl group, a pyridyl group, a piperidyl group, a quinolyl group, an isoquinolyl group, a piperidino group, a morpholino group, and a pyrrolyl group.

Specific examples of the ringed amino groups which are formed by a combination of R4 with R5 include a piperidino group, a morpholino group, a pyrrolidyl group, a piperazyl group, an imidazolidyl group, a pyrazolidyl group, an indolinyl group, an isoindolinyl group, a pyrrolyl group, an indolyl group, an isoindolyl group, and a carbazolyl group.

Specific examples of the substituents having active hydrogen include a hydroxy group, a carboxy group, an amino group, an alkylcarbonylamino group, an arylcarbonylamino group, an alkylsulfonylamino group, an arylsulfonylamino group, a carbamoyl group, an alkylcarbamoyl group, an arylcarbamoyl group, a sulfo group, a sulfino group, a sulfeno group, and an aminosulfonyl group. Specific examples of the alkylcarbonylamino group, arylcarbonylamino group, alkylcarbamoyl group and arylcarbamoyl group are mentioned above.

Specific examples of the alkylsulfonylamino group include groups in which an alkyl group or a substituted alkyl group is directly connected with the sulfur atom of a sulfonylamino group (—SO$_2$NH—). Specific examples of the alkyl groups and substituted alkyl group include the alkyl groups mentioned above.

Specific examples of the arylsulfonylamino group include groups in which an aryl group or a substituted aryl group is directly connected with the sulfur atom of a sulfonylamino group (—SO$_2$NH—). Specific examples of the aryl groups and substituted aryl groups include the aryl groups mentioned above.

Specific examples of the metal atoms for use in the azo chelate compounds of the present invention include aluminum, titanium, vanadium, chromium, manganese, iron, cobalt, nickel, copper, zinc, zirconium, niobium, molybdenum, technetium, ruthenium, rhodium, palladiumandthe like. Inparticular, azo chelate compounds including chromium, manganese, cobalt, nickel or copper have good optical properties and therefore are suitable as an optical recording material.

Next, the method for manufacturing the azo chelate compound of the present invention will be explained.

The azo chelate compound of the present invention can be synthesized by, for example, a method described in detail by Inoue in Chem. Lett., 1981, pp 1733–1736. This method is as follows, however, the manufacturing method is not limited thereto.

By reacting 2,4,6-trichloro-1,3,5-triazine (i.e., cyanuric chloride) with thiol in ethanol, a compound having the following formula (4) can be prepared:

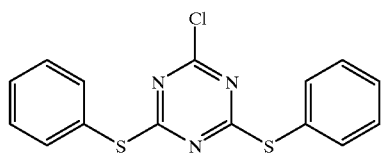

(4)

Then, by reacting the compound having formula (4) with hydrazine in ethanol, a compound having the following formula (5) can be prepared:

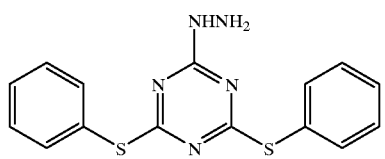

(5)

By reacting 3-(N,N-diethylamino)aniline with trifluoroacetic anhydride in 1,4-dioxane, a compound having the following formula (6) can be prepared:

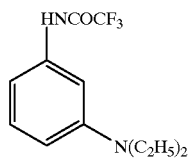

(6)

Then, by reacting the compound having formula (6) with the compound having formula (5) in acetic acid aqueous solution in the presence of potassium ferricyanate, an azo compound having the following formula (7) can be prepared:

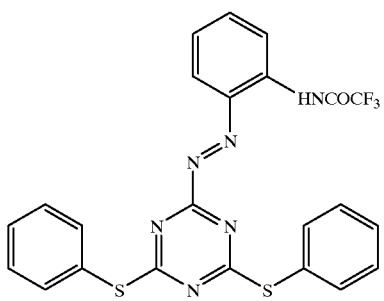

(7)

Thus, azo compounds having formula (1) can be synthesized.

By reacting the synthesized azo compound with, for example, nickel acetate in ethanol aqueous solution, a nickel chelate compound can be prepared. Thus, an azo chelate compound of the present invention can be manufactured.

At this point, an intermediate of the azo chelate compound of the present invention, 2-chloro-1,3,5-triazine having the following formula (8) whose 4 and 6 positions are substituted, such as the compound having formula (4), can be easily prepared by reacting cyanuric chloride with a compound which can perform a substitution reaction with a chlorine group.

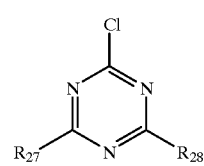

(8)

Specific examples of such intermediates other than the compounds having formula (4) are shown in Table 1.

TABLE 1

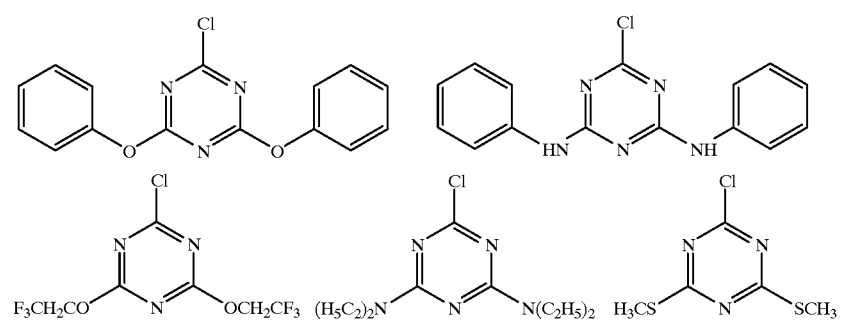

As mentioned above in the compound having formula (1), R27 and R28 of the compound having formula (8) are preferably SR7 or SR9. When a group substituted with a sulfur atom is used as R27 and R28 in the compound having formula (8), the resultant recording material has good optical properties such that the refractive index n of the resultant recording layer is from 1.5 to 3.0 when measured with light having a wavelength within ±5 nm of the wavelength of light for recording and reproducing, the extinction coefficient k of the recording layer is from 0.02 to 0.2 and the recording layer causes optical changes by irradiation with laser light having a wavelength of from 630 nm to 690 nm. However, when a group substituted with an oxygen or nitrogen atom is used as R27 and R28 in the compound having formula (8), it is difficult to obtain an optical recording medium having good optical properties.

Azo chelate compounds, which are constituted of a metal and an azo dye having formula (1) including group having a sulfur atom, cause large changes in their optical properties when exposed to laser light having a wavelength of from 600 nm to 700 nm. Therefore, these azo chelate compounds are an ideal material for optical recording media. In contrast, similar azo chelate compounds constituted of an azo dye having formula (1) including a group having an atom other than a sulfur atom have a little optical changes, and therefore it is difficult to use these compounds for optical recording media.

Next, the requisite optical and thermal properties for an optical recording medium will be explained.

With respect to the requisite optical properties, the optical recording medium of the present invention is needed to have a large absorption band over a relatively short wavelength region in a wavelength range of from 630 nm to 690 nm of the wavelength range of the recording and reproducing laser light. In this case, the laser light used for recording and reproducing information preferably has a wavelength near the upper end of the wavelength range of from 630 nm to 690 nm (i.e., in the wavelength of the reading and reproducing laser light). This means that this optical recording medium has large refractive index and extinction coefficient in the wavelength range of form 630 nm to 690 nm.

In concrete description, the recording layer of the optical recording medium of the present invention preferably has a refractive index n of from 1.5 to 3.0 and an extinction coefficient k of from 0.02 to 0.2 when the refractive index of only the recording layer is measured with light having a wavelength within ±5 nm of the wavelength of light used for recording and reproducing. It is not preferable for the recording layer to have a refractive index n not greater than 1.5, because only poor optical changes are obtained, and thereby the modulation factor in recording decreases. It is also not preferable for the recording layer to have a refractive index n not less than 3.0, because the dependency of recording and reproducing on the wavelength of the light used for recording and reproducing is excessively enhanced, and thereby a problem such as mis-recording or mis-reproducing tends to occur even when light having a wavelength in the recording and reproducing wavelength range (630 to 690 nm) is used. It is not preferable for the recording layer to have an extinction coefficient k not greater than 0.02, because the recording sensitivity deteriorates. In addition, it is not preferable for the recording layer to have an extinction coefficient k not less than 0.2, because reflectivity of 50% or greater cannot be obtained.

The thermal property requisite for the recording layer is that the weight of the recording layer rapidly decreases, as temperature increases, during a main weight decreasing process in thermogravimetry. When the material of the recording layer has such a property, the organic material layer decomposes during the main weight decreasing process, and thereby the thickness of the layer decreases and the optical constants thereof change, resulting in formation of optically-recorded portions. When the weight loss is moderate during the main weight decreasing process, the recorded portions are formed during a wide temperature range, and therefore it is difficult to perform high-density recording. Similarly, when a material having a plurality of main weight decreasing processes is used as the recording layer, it is also difficult to perform high-density recording.

In the present invention, the weight decreasing process having a maximum weight decreasing rate among weight decreasing processes is referred to as the main weight decreasing process.

In the present invention, the slope of a weight decreasing curve as shown in FIG. 1 is determined by the following method.

A sample organic material having a mass of M0 is heated at a heating speed of 10° C./min in a nitrogen atmosphere. As the organic material is heated, the mass gradually decreases along an almost straight line a–b as shown in FIG. 1. When the temperature of the material reaches a certain temperature, the mass of the material rapidly decreases along an almost straight line c–d (this is the main weight decreasing process). When the material is further heated, the rapid decrease of mass (i.e., the main weight decreasing process) ends and the mass decreases along an almost straight line e–f. Provided that the temperature and the remaining mass of the material at the intersection of the lines a–b and c–d are T1 (° C.) and m1 (%), respectively, and the temperature and the remaining mass at the intersection of the lines c–d and e–f are T2 (° C.) and m2 (%), respectively, the weight-decrease starting point is T1, the weight-decrease ending point is T2, the slope of the weight decreasing curve is (m1−m2) (%)/(T2−T1) (° C.), and the weight decreasing rate against the initial weight is (m1−m2) (%).

According to the definition mentioned above, a material, which has a slope of the weight decreasing curve not less than 2%/° C. during the main weight decreasing process, is used for the optical information recording medium, because an optical information recording medium having sharp record portions can be obtained, namely a high-density optical recording medium can be obtained.

In addition, the weight decreasing rate during the main weight decreasing process is preferably not less than 30% to obtain an optical information recording medium having a good modulation factor in recording and good record sensitivity. Further, the weight-decrease starting temperature is preferably not greater than 350° C., and more preferably from 250 to 350° C., to obtain an optical information recording medium in which recording can be stably performed without causing deterioration of reproduction and increasing the recording energy of laser light used.

Next, the structure of the optical recording medium of the present invention will be explained.

Figure 3A:
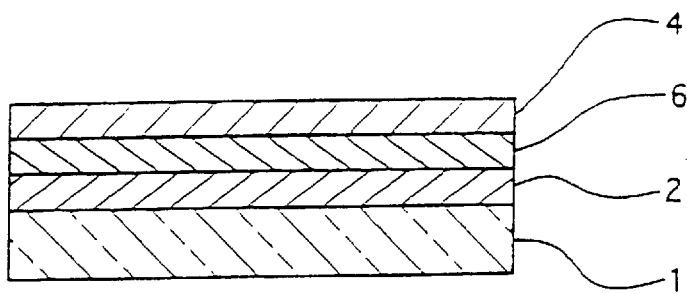
FIGS. 3A–3C are schematic diagrams illustrating sectional views of typical optical recording media for CD-Rs.
Figure 3B:
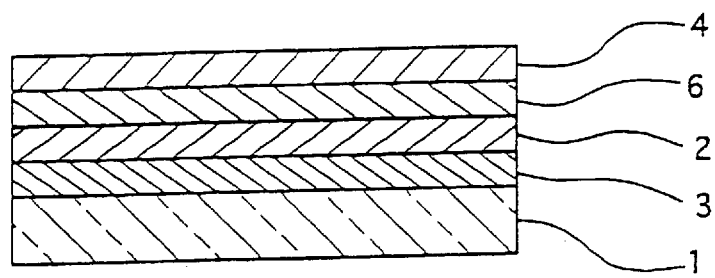
Figure 3C:
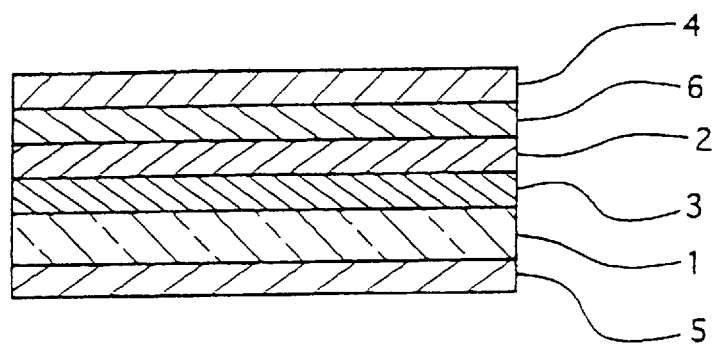
Figure 4A:
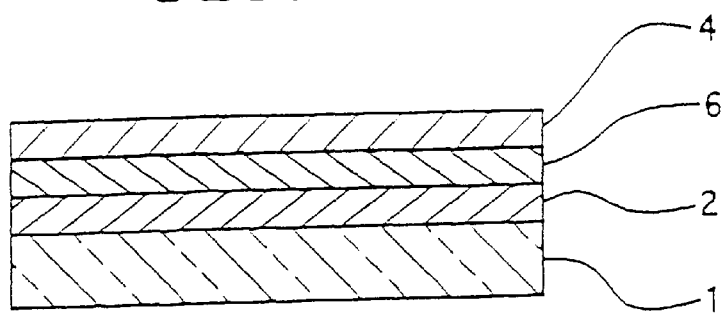
FIGS. 4A–4C are schematic diagrams illustrating sectional views of typical optical recording media for DVD-Rs.
Figure 4B:
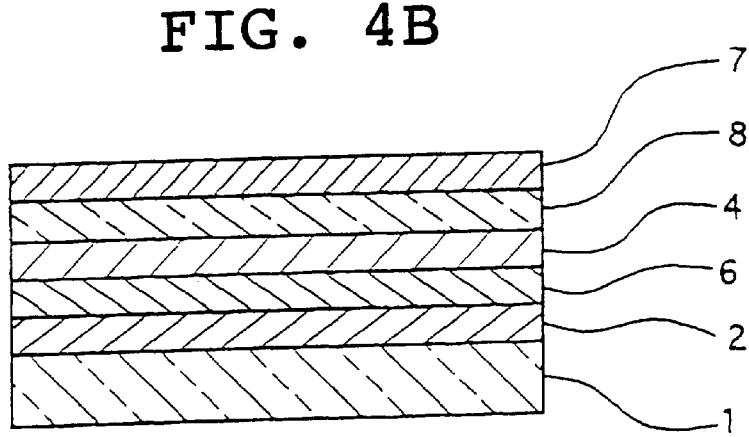
Figure 4C:
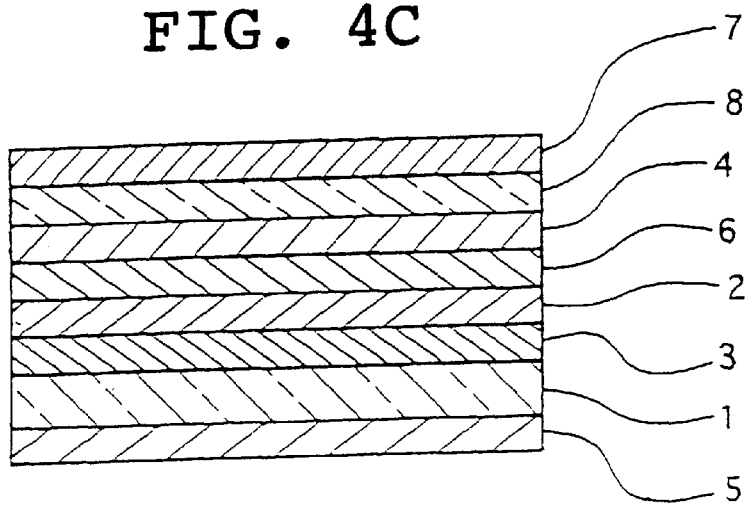

The optical recording medium of the present invention may have one of the structures of the typical recordable optical discs as shown in FIGS. 2A–2D, a so-called "air-sandwich" structure in which any two of ordinal recordable optical disc are adhered to each other with air therebetween, or a laminate structure in which any two of the typical recordable optical discs are adhered to each other without air therebetween. In addition, the optical recording medium of the present invention may have a structure such as the structures of typical CD-R media as shown in FIGS. 3A–3C or a structure such as the structures of typical DVD-R media as shown in FIGS. 4A–4C.

In FIGS. 2A–2D, numerals 1, 2, 3, 4 and 5 denote a substrate, a recording layer, an undercoat layer, a protective layer and a hard coat layer, respectively. In FIGS. 3A–3C, numeral 6 denotes a light reflective metal layer. In FIGS. 4A–4C, numerals 7 and 8 denote a second substrate and an adhesive layer, respectively.

The optical recording medium of the present invention basically has a structure in which the recording layer 6 is formed on the substrate 1. The recording layer 2 may be a single layer including an organic dye (hereinafter sometimes referred to as an organic dye layer) or a multi-layer in which an organic dye layer and a light reflective metal layer 6 are overlaid to increase reflectivity. The recording layer 2 is formed overlying the substrate 1 with the undercoat layer 3 and/or the protective layer 4 therebetween. The typical structure of the optical recording medium of the present invention is a multi-layer structure in which the organic dye layer, the metal reflection layer 6, the protective layer 4, the adhesive layer 8 and the second substrate 7 are overlaid on the substrate 1 one by one.

In the substrate 1, guide grooves or guide pits of from 1000 to 2500 Å in depth are formed for tracking, and pre-formats such as address signals are formed. The track pit is generally has a size of from 0.7 to 1.0 μm, however, the pitch is preferably from 0.7 to 0.8 μm for high-density data storage. The width of the grooves is preferably from 0.18 to 0.36 μm in half width to obtain satisfactory signal strength for tracking errors and to avoid the horizontal spread of recorded portions.

The property requisite for the substrate 1 is to be transparent against laser light used if the recording and reproducing operations are performed from the side of the substrate 1. When the recording and reproducing operations are performed from the side of the recording layer 2 (i.e., from the side of the protective layer 4), the substrate is not necessarily transparent. In the present invention, when only one substrate is used, the substrate should be transparent. When two substrates are used and the second substrate is transparent, the substrate 1 may be transparent or untransparent.

Specific examples of the material for use as the substrates 1 and 7 include plastics such as polyester resins, acrylic resins, polyamide resins, polycarbonate resins, polyolefin resins, phenolic resins, epoxy resins, and polyimide resins; glass, ceramics, and metals. When only one substrate is used, or two substrates (i.e., the first and second substrate) are used while the substrates sandwich the aforementioned layers, guide grooves or guide pits for tracking, and pre-formats such as address signals should be formed on the only substrate and the first substrate.

Next, the undercoat layer 3 will be explained in detail. In the present invention, each of layers, other than the recording layer 2, light reflective metal layer 6 and protective layer 7, such as the undercoat layer 3 and adhesive layer 8 formed overlying the substrate 1, is referred to as an intermediate layer. The intermediate layer is formed:

(a) to improve the adhesion of the layers to the substrate 1 or the other layers;

(b) to decrease the permeability to water, gases or the like;

(c) to improve the preservability of the recording layer 2;

(d) to improve the reflectivity of the optical recording medium;

(e) to protect the optical recording medium from various solvents; and (f) to form therein guide grooves, guide pits, pre-formats and the like.

In order to attain the purpose (a), high molecular weight materials such as ionomer resins, polyamide resins, vinyl resins, natural resins, natural high molecular weight materials, silicones, and liquid rubbers; silane coupling agents and the like are preferably used. In order to attain the purposes (b) and (c), inorganic compounds such as $SiO_2$, $MgF_2$, SiO, $TiO_2$, ZnO, TiN, SiN and the like; metals or semi-metals such as Zn, Cu, Ni, Cr, Ge, Se, Au, Ag, Al and the like are preferably used as well as the high molecular weight materials mentioned above. In order to attain the purpose (d), metals such as Al, Ag, and the like; and a thin film of organic materials, which has metallic gloss, such as methine dyes, xanthene dyes and the like can be used. In order to attain the purposes (e) and (f), ultraviolet crosslinking resins, thermosetting resins, thermoplastic resins and the like can be used.

The thickness of the intermediate layer is preferably from 0.01 to 30 μm, and more preferably from 0.05 to 10 μm.

Next, the recording layer 2 will be explained in detail.

Information can be recorded in the recording layer by changing the optical properties of the recording layer 2 with laser light. It is needed for the recording layer 2 to include the dye of the present invention. The dye of the present invention can be used alone or in combination in the recording layer 2. In order to improve the optical properties, recording sensitivity and signal characteristics, other organic dyes, metals or metal compounds can also be used while being mixed with the dye of the present invention or while being included in a layer which is overlaid on the recording layer 2.

Specific examples of the organic dyes for use in the recording layer 2 include polymethine dyes, naphthalocyanine dyes, phthalocyanine dyes, squarylium dyes, croconium dyes, pyrylium dyes, naphthoquinone dyes, anthraquinone (Indanthrene) dyes, xanthene dyes, triphenyl methane dyes, azulene dyes, tetrahydrocholine dyes, phenanthrene dyes, triphenothiazine dyes, and metal chelate compounds. These dyes are used alone or in combination.

When the dye of the present invention is used in combination with dyes having maximum absorption in a wavelength range of from 680 to 750 nm to prepare a CD-R medium which can record and reproduce information with light having a relatively short wavelength, known dyes disclosed in Japanese Patent Publications mentioned above in the paragraph of discussion of the related art in the present application can be used. Specific examples of the dyes which have maximum absorption in a wavelength range of from 680 to 750 nm include the following dyes:

(1) cyanine dyes having a formula (9) described below;

(2) phthalocyanine dyes having a formula (10) described below;

(3) phthalocyanine dyes having a formula (11) described below; and (4) azo chelate compounds having a formula (12) described below.

(9)

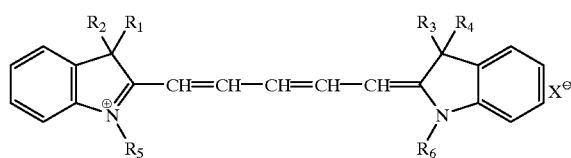

wherein R1, R2, R3 and R4 independently represent an alkyl group having 1 to 3 carbon atoms; R5 and R6 independently represent an alkyl group having 1 to 6 carbon atoms which may be substituted; X represents an acid anion; and the aromatic rings may be condensed with another aromatic ring and may be substituted with a halogen atom, an alkyl group, an alkoxy group or an acyl group.

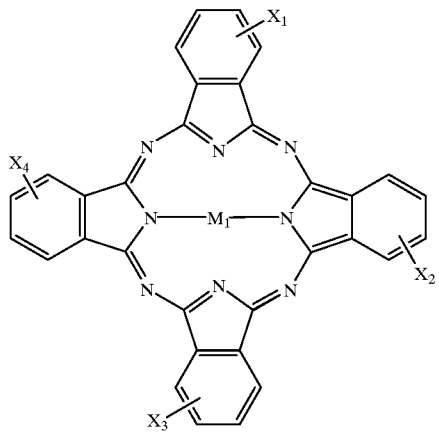

(10)

wherein M1 represents Ni, Pd, Cu, Zn, Co, Mn, Fe, TiO or VO; X1 to X4 independently represent a group of —OR or —SR which connects the α-position thereof, or a hydrogen atom except that X1 to X4 are all a hydrogen atom, wherein the substituents of the benzene rings other than the groups X1 to X4 are a hydrogen or a halogen atom, and wherein R represents an alkyl group having 3 to 12 carbon atoms which may be substituted and may be linear or branched, a cycloalkyl group, or an aryl group which may be substituted.

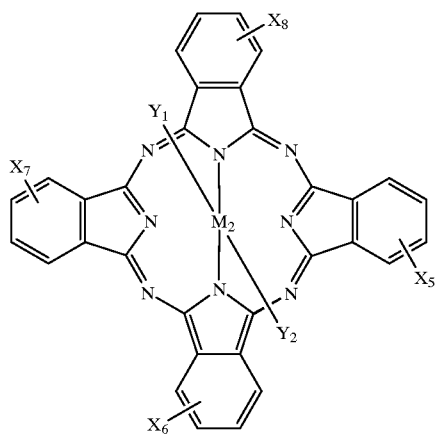

(11)

wherein M2 represents Si, In or Sn; X5 to X8 independently represent a group of —OR or —SR which connects the α-position thereof, or a hydrogen atom except that X5 to X8 are all a hydrogen atom, wherein the substituents of the benzene rings other than the groups X5 to X8 are a hydrogen or a halogen atom and wherein R is defined above in formula (10); and Y1 and Y2 independently represent a group of —OSiRaRbRc, —OCORa, or —OPORaRb, wherein Ra, Rb and Rc independently represent an alkyl group having 1 to 10 carbon atoms, or an aryl group.

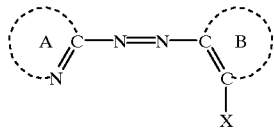

(12)

wherein the compounds having formula (12) are a compound constituted of one or more of the azo chelate compounds in which the metal is preferably Ni, Pt, Pd, Co, Cu, Zn and the like; A represents a residual group which forms a heterocyclic ring together with the carbon atom and the nitrogen atom with which A combines; B represents a residual group which forms an aromatic ring or a heterocyclic ring together with the carbon atoms with which B combines; and X represents a group having active hydrogen.

The mixing ratio of the dye of the present invention to the above-mentioned dye having maximum absorption in a wavelength range of from 680 to 750 nm is preferably from 10:100 to 90:100, and more preferably from 20:100 to 40:100. The thickness of the recording layer 2 is preferably from 500 Å to 5 μm, and more preferably from 1000 Å to 5000 Å.

In addition, one or more metals or metal compounds such as In, Te, Bi, Se, Sb, Ge, Sn, Al, Be, $TeO_2$, SnO, As, Cd and the like can be mixed with the dyes mentioned above while being dispersed therein. Further, a layer of the above-mentioned metal or metal compound may be formed adjacent to the dye layer. The dye layer may include a material such as high molecular weight materials, e.g., ionomer resins, polyamide resins, vinyl resins, natural high molecular weight materials, silicones and liquid rubbers; and silane coupling agents. In addition, a stabilizer such as complexes of transition metals, dispersants, flame retardants, lubricants, antistatic agents, surfactants, plasticizers and the like can be used in combination with the dyes mentioned above to improve various properties.

The recording layer 2 can be formed by a known method such as vacuum evaporation methods, sputtering methods, chemical vapor deposition (CVD) methods, and coating methods. When coating methods are used, a coating liquid, which is prepared by dissolving the above-mentioned dye in an appropriate organic solvent, is coated by a known coating method such as spray coating methods, roller coating methods, dip coating methods, and spin coating methods.

Specific examples of the organic solvents for use in the coating liquid include alcohols such as methanol, ethanol, and isopropanol; ketones such as acetone, methyl ethyl ketone and cyclohexanone; amides such as N,N-dimethylformamide and N,N-dimethylacetoamide; sulfoxides such as dimethylsulfoxides; ethers such as tetrahydrofuran, dioxane, diethylether and ethylene glycol monomethyl ether; esters such as methyl acetate and ethyl acetate; halogenated aliphatic hydrocarbons such as chloroform, methylene chloride, dichloroethane, carbon tetrachloride and trichloroethane; aromatic hydrocarbons such as benzene, xylene, monochlorobenzene and dichlorobenzene; cellosolves such as methoxyethanol and ethoxyethanol; hydrocarbons such as hexane, pentane, cyclohexane and methylcyclohexane; and the like.

The thickness of the recording layer 2 is preferably from 100 Å to 10 μm, and preferably from 200 Å to 2000 Å.

Next, the light reflective metal layer 6 will be explained in detail. Suitable metals for use in the light reflective metal layer 6 include metals and semi-metals which have a high reflectivity themselves and which are hardly corroded. Specific examples of such metals and semi-metals include Au, Ag, Cr, Ni, Al, Fe, Sn and the like. Among these metals Au, Ag and Al is most preferable because of having good reflectivity and productivity. These metals and semi-metals can be used alone or in combination.

The light reflective metal layer 6 can be formed by a method such as vacuum evaporation methods, sputtering methods and the like. The thickness thereof is preferably from 50 to 5000 Å, and more preferably from 100 to 3000 Å.

Next, the protective layer 4, and the hard coat layer 5 which is formed on the substrate 1 will be explained in detail.

The protective layer 4 and the hard coat layer 5 are formed:

(a) to protect the recording layer 2 (a reflection absorbing layer) from being hurt, soiled or dusty;

(b) to improve the preservability of the recording layer 2 (a reflection absorbing layer); and (c) to improve the reflectivity.

In order to attain these purposes, the materials mentioned above for use in the intermediate layer can be used. In addition, inorganic materials such as SiO and $SiO_2$, can also be used, and organic materials thermosoftenable or thermofusible resins, e.g., polymethyl methacrylate, polycarbonate, epoxy resins, polystyrene resins, polyester resins, vinyl resins, cellulose resins, aliphatic hydrocarbon resins, aromatic hydrocarbon resins, natural rubbers, styrene-butadiene resins, chloroprene rubbers, waxes, alkyd resins, drying oils and rosins can also be used.

Among these materials, ultraviolet crosslinking resins are most preferable for the protective layer 4 and the hard coat layer 5 because of having good productivity. The thickness of the protective layer 4 and the hard coat layer 5 is preferably form 0.01 to 30 μm, and more preferably from 0.05 to 10 μm. Similarly to the case of the recording layer 2, stabilizers, dispersants, flame retardants, lubricants, antistatic agents, surfactants, plasticizers and the like can also be included in the intermediate layer, protective layer 4 and hard coat layer 5.

When an optical recording medium including one or more of the azo chelate compounds of the present invention is used, light having a wavelength of from 630 to 690 nm is preferably used for reproducing information.

When an optical recording medium including a combination of one or more of the azo chelate compounds of the present invention with one or more dyes having maximum absorption is used, light having a wavelength of from 770 to 810 nm is preferably used for recording information, and light has a wavelength of from 770 to 810 nm or from 630 to 690 nm is preferably used for reproducing information.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Metal chelate compounds including an azo compound having the following formula (13) are examples of the azo chelate compounds of the present invention.

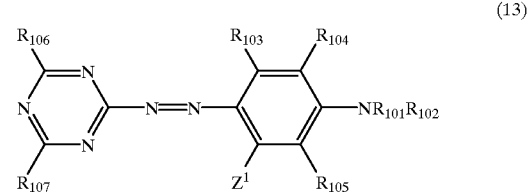

(13)

Various azo chelate compounds constituted of an azo compound formula (13) are shown in Table 2.

TABLE 2

| Comp. No. | $R_{101}$ | $R_{102}$ | $R_{103}$ | $R_{104}$ | $R_{105}$ | $R_{106}$ | $R_{107}$ | $Z^1$ | M |
|---|---|---|---|---|---|---|---|---|---|
| 1 | $C_4H_9$ | $C_4H_9$ | H | H | H | H | H | $NH_2$ | Ni |
| 2 | $C_4H_9$ | $C_4H_9$ | H | $OC_2H_5$ | H | H | H | COOH | Ni |
| 3 | $C_4H_9$ | $C_4H_9$ | H | $OC_2H_5$ | H | Cl | Cl | COOH | Ni |
| 4 | H | o-Ome—Ph | H | $OCH_3$ | H | H | H | OH | Cu |
| 5 | H | o-$CF_3$—Ph | H | H | H | H | H | OH | Cu |
| 6 | H | o-$CF_3$—Ph | H | H | H | Br | Br | OH | Ni |
| 7 | $C_3H_7$ | $C_3H_7$ | H | H | H | $OCH_3$ | $OCH_3$ | COOH | Ni |
| 8 | $C_3H_7$ | $C_3H_7$ | H | H | H | $OCH_3$ | $OCH_3$ | OH | Co |
| 9 | $C_3H_7$ | $C_3H_7$ | H | H | H | Br | Br | $SO_3H$ | Co |
| 10 | $C_3H_7$ | $C_3H_7$ | H | H | H | $NH_2$ | $NH_2$ | OH | Cu |
| 11 | H | o-$CF_3$—Ph | H | H | H | $NMe_2$ | $NMe_2$ | OH | Cu |
| 12 | $C_3H_7$ | $C_3H_7$ | H | H | H | $NO_2$ | $NO_2$ | $NH_2$ | Ni |
| 13 | H | o-Ome—Ph | H | $OCH_3$ | H | $NMe_2$ | Cl | OH | Ni |
| 14 | H | o-$CF_3$—Ph | H | H | H | $CH_3$ | $CH_3$ | $SO_3H$ | Cu |
| 15 | $C_4H_9$ | $C_4H_9$ | H | H | H | Cl | Cl | OH | Co |
| 16 | $C_3H_7$ | $C_3H_7$ | H | H | H | $NHC_6H_5$ | $NHC_6H_5$ | OH | Co |
| 17 | $C_4H_9$ | $C_4H_9$ | H | H | H | $OCH_3$ | $OCH_3$ | OH | Cu |
| 18 | H | o-Ome—Ph | H | $OCH_3$ | H | $NMe_2$ | $NMe_2$ | COOH | Ni |
| 19 | $C_3H_7$ | $C_3H_7$ | H | H | H | $NMe_2$ | Cl | COOH | Cu |
| 20 | $C_4H_9$ | $C_4H_9$ | H | H | H | Br | Br | COOH | Ni |
| 21 | $C_4H_9$ | $C_4H_9$ | H | H | H | $OCH_3$ | $OCH_3$ | COOH | Co |
| 22 | H | o-$CF_3$—Ph | H | H | H | $NMe_2$ | Cl | COOH | Ni |
| 23 | $C_4H_9$ | $C_4H_9$ | H | H | H | $NMe_2$ | Ph | OH | Cu |
| 24 | H | o-Ome—Ph | H | $OCH_3$ | H | H | Br | OH | Ni |
| 25 | $C_4H_9$ | $C_4H_9$ | H | H | H | $NMe_2$ | Cl | OH | Ni |

TABLE 2-continued

| Comp. No. | $R_{101}$ | $R_{102}$ | $R_{103}$ | $R_{104}$ | $R_{105}$ | $R_{106}$ | $R_{107}$ | $Z^1$ | M |
|---|---|---|---|---|---|---|---|---|---|
| 26 | H | o-CF$_3$—Ph | H | H | H | NMe$_2$ | NMe$_2$ | COOH | Cu |
| 27 | C$_4$H$_9$ | C$_4$H$_9$ | H | H | H | Br | Br | OH | Cu |
| 28 | C$_3$H$_7$ | C$_3$H$_7$ | H | H | H | H | Br | OH | Co |
| 29 | C$_3$H$_7$ | C$_3$H$_7$ | H | H | H | NC$_4$H$_8$ | NC$_4$H$_8$ | OH | Ni |
| 30 | H | o-Ome—Ph | H | OCH$_3$ | H | NC$_4$H$_8$ | NC$_4$H$_8$ | COOH | Ni |
| 31 | C$_3$H$_7$ | C$_3$H$_7$ | H | H | H | NC$_4$H$_8$O | NC$_4$H$_8$O | OH | Ni |

Example 1

An organic dye layer including a compound No. 6 was formed on a polycarbonate substrate of 0.6 mm in thickness which had been prepared by injection molding and which had guide grooves having a depth of 1400 Å, a half width of 0.35 μm, and a track pitch of 1.0 μm. The organic dye layer was formed by coating by a spin coating method a coating liquid in which compound No. 6 was dissolved in a mixed solvent of methylcyclohexane, 2-methoxyethanol and methyl ethyl ketone. The thickness of the dye layer was 800 Å. Then a light reflective gold layer having a thickness of 2000 Å was formed thereon by a sputtering method, and further thereon a protective layer having a thickness of 5 μm was formed by coating an acrylic photopolymer.

Thus, an optical recording medium of the present invention was prepared.

Examples 2–6

The procedure for preparation of the optical recording medium in Example 1 was repeated except that compound No. 6 was replaced with a compound No. 7, 13, 21, 23 or 25.

Thus, optical recording media of the present invention were prepared.

Comparative Example 1

The procedure for preparation of the optical recording medium in Example 1 was repeated except that compound No. 6 was replaced with a compound having the following formula (14).

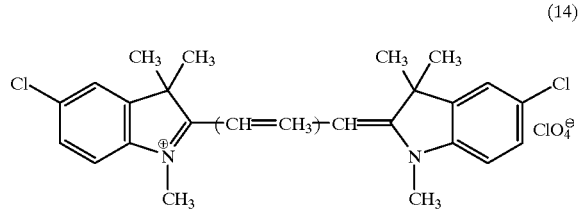

(14)

Thus, a comparative optical recording medium was prepared.

Each of optical recording media of Examples 1 to 6 and Comparative Example 1 was evaluated with respect to the following items:
(1) Reflectivity Absolute reflectivity was measured by a V-N method using a spectrophotometer. The unit of absolute reflectivity is percent (%).
(2) C/N ratio A C/N ratio was evaluated by the following recording and reproducing:
1) Recording conditions
Wavelength of oscillated laser: 635 nm (NA of 0.6)
Frequency in recording: 3.8 MHz
Linear speed in recording: 3.0 m/sec
2) Reproducing conditions
Wavelength of oscillated laser: 650 nm
Power in reproduction: 0.6 to 0.9 mW (continuous light)
The unit of C/N ratio is dB.
(3) Light irradiating test
Xenon light of 40,000 lux irradiated each optical recording medium for 20 hours. After the test, each optical recording medium was evaluated with respect to reflectivity and C/N ratio.

The results are shown in Table 3.

TABLE 3

| | Initial value | | After the light irradiating test | |
|---|---|---|---|---|
| | Reflectivity (%) | C/N ratio (dB) | Reflectivity (%) | C/N ratio (dB) |
| Ex. 1 | 72 | 55 | 68 | 52 |
| Ex. 2 | 70 | 54 | 67 | 51 |
| Ex. 3 | 69 | 52 | 67 | 51 |
| Ex. 4 | 73 | 56 | 69 | 52 |
| Ex. 5 | 74 | 55 | 69 | 52 |
| Ex. 6 | 72 | 55 | 68 | 51 |
| Comp. EX. 1 | 74 | not measurable | 58 | not measurable |

Example 7

A coating liquid in which a mixture of the compound having formula (14) and a compound No. 11 in a ratio of 1:1 by weight was dissolved in a mixed solvent of methylcyclohexane, 2-methoxyethanol, methyl ethyl ketone and tetrahydrofuran was coated by a spin coating method on a polycarbonate substrate of 1.2 mm in thickness which had been prepared by injection molding and which had guide grooves having a depth of 1500 Å, a half width of 0.40 μm, and a track pitch of 1.1 μm. Thus an organic dye layer having a thickness of 1700 Å was formed on the substrate. Then a light reflective gold layer having a thickness of 2000 Å was formed thereon by a sputtering method, and further thereon a protective layer having a thickness of 5 μm was formed by coating an acrylic photo-polymer.

Thus, an optical recording medium of the present invention was prepared.

Examples 8 and 9

The procedure for preparation of the optical recording medium in Example 7 was repeated except that compound No. 11 was replaced with a compound No. 10 or 23.

Thus, optical recording media of the present invention were prepared.

Examples 10 and 11

The procedure for preparation of the optical recording medium in Example 7 was repeated except that compound No. 11 was replaced with a compound No. 16 or 29 while the compound having formula (14) was replaced with a compound having the following formula (15):

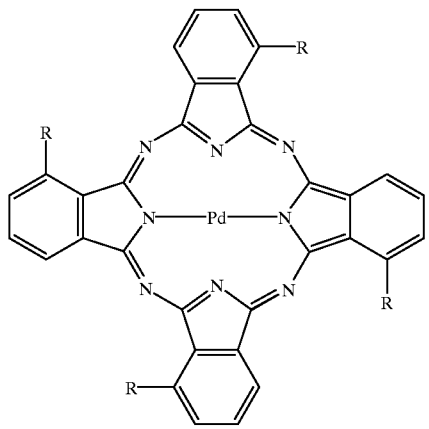

(15)

R = OCH(CH(CH$_2$)$_2$)$_2$

Thus, optical recording media of the present invention were prepared.

Comparative Example 2

The procedure for preparation of the optical recording medium in Example 7 was repeated except that the mixture of the compound having formula (14) with a compound No.11 was replaced with the compound having formula (14).

Thus, a comparative optical recording medium was prepared.

Comparative Example 3

The procedure for preparation of the optical recording medium in Example 7 was repeated except that the mixture of the compound having formula (14) with a compound No.11 was replaced with the compound having formula (15).

Thus, a comparative optical recording medium was prepared.

Each of the optical recording media of Examples 7 to 11 and Comparative Examples 2 and 3 was evaluated with respect to the following items:

(1) Reflectivity

The measuring method was described above.

(2) Waveform of Reproduced Signals

EFM signals were recorded at a linear speed of 1.4 m/sec using laser light of a laser diode having a wavelength of 780 nm and a beam diameter of 1.6 μm while tracking. The signals were reproduced with the laser light used for recording, or continuous light of a laser diode having a wavelength of 650 nm and a beam diameter of 1.0 μm. The waveform of the reproduced signals was observed.

The results are shown in Table 4.

TABLE 4

|  | Laser having wavelength of 780 nm | | Laser having wavelength of 650 nm | |
|---|---|---|---|---|
|  | Reflectivity % | Waveform | Reflectivity % | Waveform |
| Ex. 7 | 68 | Clear | 25 | Clear |
| Ex. 8 | 67 | Clear | 24 | Clear |
| Ex. 9 | 68 | Clear | 26 | Clear |
| Ex. 10 | 66 | Clear | 24 | Clear |
| Ex. 11 | 68 | Clear | 25 | Clear |
| Comp. Ex. 2 | 72 | Clear | 5 | not reproduced |
| Comp. Ex. 3 | 70 | Clear | 10 | not reproduced |

Azo chelate compounds including an azo compound having the following formula (16) are examples of the azo chelate compounds of the present invention.

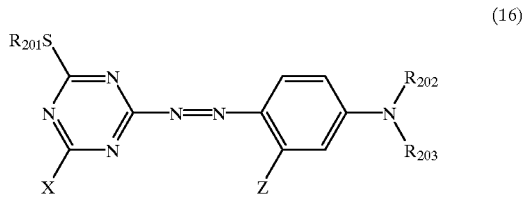

(16)

Various azo chelate compounds including a compound having formula (16) are shown in Table 5.

TABLE 5

| Comp. No. | $R_{201}$ | $R_{202}$ | $R_{203}$ | X | Z | M |
|---|---|---|---|---|---|---|
| 32 | Ph | Et | Et | OPh | NHSO$_2$Ph | Ni |
| 33 | Ph | Et | Et | OPh | NHSO$_2$CF$_3$ | Ni |
| 34 | Ph | Et | Et | OPh | COOH | Ni |
| 35 | Ph | Et | Et | OPh | SO$_3$H | Ni |
| 36 | Ph | Et | Et | OPh | NHCO(o-CF$_3$)Ph | Ni |
| 37 | Ph | nPr | nPr | OPh | NHCOCF$_3$ | Ni |
| 38 | Ph | Et | Et | OPh | HNSO$_2$CF$_3$ | Mn |
| 39 | Ph | Et | Et | OPh | NHSO$_2$CF$_3$ | Cu |
| 40 | Ph | Et | Et | OMe | NHSO$_2$Ph | Pb |
| 41 | Ph | nBu | nBu | OEt | HNCO(o-CF$_3$)Ph | Co |
| 42 | Ph | Et | Et | OCH$_2$CF$_3$ | COOH | Ni |
| 43 | Ph | Et | Et | O(3-CN)Ph | NHSO$_2$CF$_3$ | Ni |
| 44 | Ph | Et | Et | O(3-CN)Ph | NHCO(o-CF$_3$)Ph | Cu |
| 45 | Ph | Et | Et | O(4-NH$_2$)Ph | NHSO$_2$Ph | Mn |
| 46 | Ph | Et | Et | NMe$_2$ | NHSO$_2$Ph | Ni |
| 47 | Ph | Ph | Ph | NMe$_2$ | NHSO$_2$CF$_3$ | Cu |
| 48 | Ph | Et | Et | NMe$_2$ | COOH | Ni |
| 49 | Ph | Et | Et | NMe$_2$ | NHCO(o-CF$_3$)Ph | Pb |
| 50 | Ph | Et | Et | NHPh | NHCOCF$_3$ | Ni |
| 51 | Ph | Et | Et | NHPh | NHSO$_2$Ph | Mn |
| 52 | Ph | Et | Et | NHPh | SO$_3$H | Ni |
| 53 | (2.6-Me)Ph | Et | Et | OPh | NHSO$_2$Ph | Ni |
| 54 | (2.6-Me)Ph | Et | Et | OPh | NHSO$_2$CF$_3$ | Mn |
| 55 | (2.6-Me)Ph | Et | Et | OMe | NHSO$_2$Ph | Pd |
| 56 | (2.6-Me)Ph | nPr | nPr | NMe$_2$ | NHSO$_2$Ph | Mn |
| 57 | (2.6-Me)Ph | Et | Et | NMe$_2$ | NHSO$_2$CF$_3$ | Cu |
| 58 | (2.6-Me)Ph | Et | Et | NMe$_2$ | COOH | Ni |
| 59 | (2.6-Me)Ph | Et | Et | NHPh | NHCOCF$_3$ | Ni |

TABLE 5-continued

| Comp. No. | $R_{201}$ | $R_{202}$ | $R_{203}$ | X | Z | M |
|---|---|---|---|---|---|---|
| 60 | (2.6-Me)Ph | Et | Et | NHPh | $NHSO_2Ph$ | Mn |
| 61 | (2.6-Me)Ph | Et | Et | NHPh | $SO_3H$ | Ni |
| 62 | (4-tBu)Ph | Et | Et | OPh | $NHSO_2Ph$ | Mn |
| 63 | (4-tBu)Ph | Et | Et | OPh | $NHSO_2CF_3$ | Cu |
| 64 | (4-tBu)Ph | nBu | nBu | $OCH_2CF_3$ | COOH | Ni |
| 65 | (4-tBu)Ph | Et | Et | O(3-CN)Ph | $NHSO_2CF_3$ | Ni |
| 66 | (4-tBu)Ph | Et | Et | $O(4-NH_2)Ph$ | $NHSO_2Ph$ | Mn |
| 67 | (4-tBu)Ph | Et | Et | $NMe_2$ | $NHSO_2Ph$ | Cu |
| 68 | (4-tBu)Ph | Et | Et | $NMe_2$ | $NHSO_2CF_3$ | Ni |
| 69 | (4-tBu)Ph | Et | Et | $NMe_2$ | COOH | Ni |
| 70 | (4-tBu)Ph | Et | Et | $NMe_2$ | $NHSO_2Ph$ | Mn |
| 71 | (4-tBu)Ph | Et | Et | $NMe_2$ | $NHSOCF_3$ | Cu |
| 72 | (4-tBu)Ph | Et | Et | $NMe_2$ | COOH | Ni |
| 73 | (4-tBu)Ph | Et | Et | NHPh | $NHCOCF_3$ | Ni |
| 74 | (4-tBu)Ph | Et | Et | NHPh | $NHSO_2Ph$ | Mn |
| 75 | (4-tBu)Ph | Ph | Ph | NHPh | $SO_3H$ | Ni |

Example 12

A coating liquid in which a compound No. 32 was dissolved in a mixed solvent of methylcyclohexane, 2-methoxyethanol, and methyl ethyl ketone was coated by a spin coating method on a polycarbonate substrate of 0.6 mm in thickness which had been prepared by injection molding and which had guide grooves having a depth of 1600 Å, a half width of 0.28 μm, and a track pitch of 0.74 μm. Thus, an organic dye layer having a thickness of 800 Å was formed on the substrate. Then a light reflective gold layer having a thickness of 1500 Å was formed thereon by a sputtering method, and further thereon a protective layer having a thickness of 5 μm was formed by coating an acrylic photopolymer. In addition, a polycarbonate substrate prepared by injection molding and having a thickness of 0.6 mm was laminated thereon.

Thus, an optical recording medium of the present invention was prepared.

Examples 13–19

The procedure for preparation of the optical recording medium in Example 12 was repeated except that compound No. 32 was replaced with a compound No. 33, 37, 38, 43, 47, 54 or 67.

Thus, optical recording media of the present invention were prepared.

Comparative Examples 4–6

The procedure for preparation of the optical recording medium in Example 12 was repeated except that compound No. 32 was replaced with a compound having the following formula (17), (18) or (19).

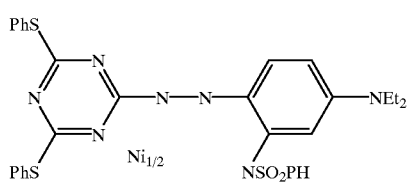
(17)

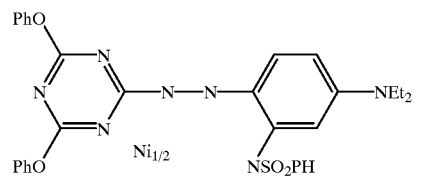
(18)

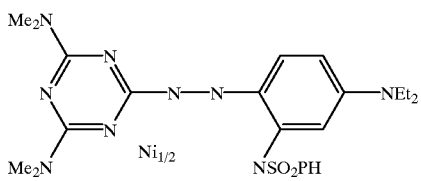
(19)

Thus, comparative optical recording media was prepared.

Each of the optical recording media of Examples 12 to 19 and Comparative Examples 4 to 6 was evaluated with respect to reflectivity. The conditions were as follows:

(1) Recording Conditions

Wavelength of oscillated laser: 635 nm

Recording data: EFM signals

Linear speed: 3.4 m/sec (2) Reproducing Conditions

Wavelength of oscillated laser: 650 nm

Power in reproduction: 0.8 mW (continuous light)

(3) Light Irradiating Test

Xenon light of 50,000 lux continuously irradiated each optical recording medium. After the test, each optical recording medium was evaluated with respect to light-deterioration rate constant.

The results are shown in Table 6.

TABLE 6

| | Recording/reproducing signal characteristics | | | After light irradiation test Light- |
|---|---|---|---|---|
| | Reflectivity (*) (%) | Modulation factor (%) | Power needed for recording (mW) | deterioration rate constant ($sec^{-1}$) |
| Ex. 12 | 68 | 62 | 10 | 1.19E-7 |
| Ex. 13 | 70 | 61 | 11 | 3.77E-7 |
| Ex. 14 | 69 | 60 | 10 | 2.34E-7 |
| Ex. 15 | 68 | 62 | 9.5 | 9.32E-8 |
| Ex. 16 | 69 | 61 | 11 | 1.01E-7 |
| Ex. 17 | 69 | 60 | 9.5 | 3.19E-7 |
| Ex. 18 | 70 | 61 | 9.5 | 6.84E-8 |
| Ex. 18 | 68 | 60 | 9 | 2.69E-7 |
| Comp. Ex. 4 | 69 | 62 | 9 | 2.27E-6 |
| Comp. Ex. 5 | 68 | 52 | 14 | 1.07E-7 |
| Comp. Ex. 6 | 69 | 48 | 13 | 8.08E-7 |

(*) Reflectivity was measured at a plane.

Azo chelate compounds as shown in Table 7 were prepared.

TABLE 7
| Comp. No. | Azo dye | Metal |
|---|---|---|
| 76 | 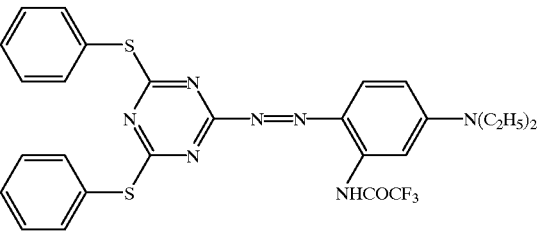 | Ni |
| 77 | 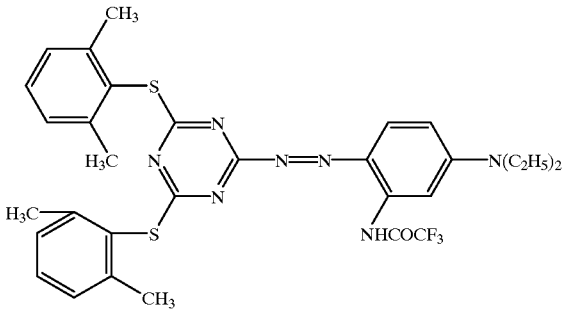 | Ni |
| 78 | 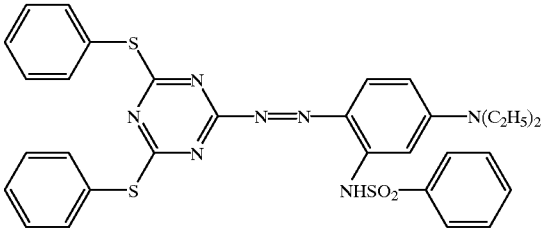 | Ni |
| 79 | 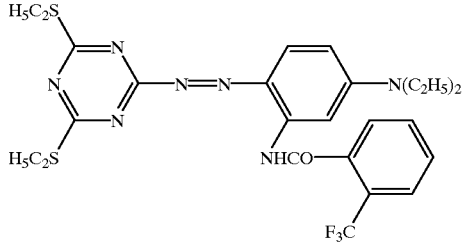 | Cu |
| 80 | 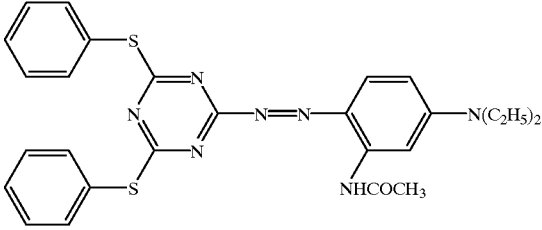 | Co |

TABLE 7-continued

| Comp. No. | Azo dye | Metal |
|---|---|---|
| 81 | (structure: 4,6-bis(phenylthio)-1,3,5-triazin-2-yl azo linked to 4-N(C₂H₅)₂, 2-NHCOCH₃ phenyl) | Cu |
| 82 | (structure: 4,6-bis(phenylthio)-1,3,5-triazin-2-yl azo linked to 4-N(C₂H₅)₂, 2-NHSO₂CF₃ phenyl) | Ni |
| 83 | (structure: 4,6-bis(phenylthio)-1,3,5-triazin-2-yl azo linked to 4-N(C₂H₅)₂, 2-NHCO(2-CF₃-phenyl)) | Ni |
| 84 | (structure: 4,6-bis(ethylthio)-1,3,5-triazin-2-yl azo linked to 4-N(C₂H₅)₂, 2-NHCO-phenyl) | Cu |
| 85 | (structure: 4,6-bis(phenylthio)-1,3,5-triazin-2-yl azo linked to 4-pyrrolidinyl, 2-NHCOCF₃ phenyl) | Ni |

TABLE 7-continued

| Comp. No. | Azo dye | Metal |
|---|---|---|
| 86 | (structure) | Ni |
| 87 | (structure) | Ni |
| 88 | (structure) | Ni |
| 89 | (structure) | Ni |
| 90 | (structure) | Cu |

TABLE 7-continued

| Comp. No. | Azo dye | Metal |
|---|---|---|
| 91 | (structure) | Co |
| 92 | (structure) | Ni |
| 93 | (structure) | Mn |
| 94 | (structure) | Mn |
| 95 | (structure) | Mn |

Example 20

Guide grooves having a depth of 1600 Å, a half width of 0.24 μm, and a track pitch of 0.74 μm were formed using a photo-polymer on a polycarbonate resin substrate prepared by injection molding. A liquid in which a compound No. 76 was dissolved in a mixed solvent of methylcyclohexane, 2-methoxyethanol and methyl ethyl ketone was coated on the substrate by a spin coating method to form an organic dye layer having a thickness of 800 Å. A light reflective gold layer having a thickness of 2000 Å was formed thereon by a sputtering method. Further thereon a protective layer having a thickness of 5 μm was formed by coating an acrylic photo-polymer.

Thus, an optical recording medium of the present invention was prepared.

Examples 21–34

The procedure for preparation of the optical recording medium in Example 20 was repeated except that compound No. 76 was replaced with each of compounds Nos. 77–87 and 93–95.

Thus, optical recording media of the present invention were prepared.

Each of the optical recording media of Examples 20 to 34 was evaluated with respect to reflectivity and modulation factor. In addition, reflectivity and modulation factor were also measured after a light irradiation test or a preservation test.

(1) Recording Conditions

EFM signals were recorded at a linear speed of 3.4 m/sec using laser light of a laser diode having a wavelength of 650 nm and a beam diameter of 1.0 μm while tracking. The signals were reproduced with continuous light of a laser diode having a wavelength of 650 nm, a beam diameter of 1.0 μm and a reproduction power of 0.7 mW. The waveform of the reproduced signals was observed.

(2) Light Irradiation Test

Xenon light of 40,000 Lux irradiated each optical recording medium for 20 hours.

(3) Preservation Test

Each optical recording medium was preserved for 500 hours under conditions of 85° C. in temperature and 85% in relative humidity.

The results are shown in Table 8.

TABLE 8

|  | Initial value | | After light irradiation test | | After preservation test | |
|---|---|---|---|---|---|---|
|  | Reflectivity (%) | Modulation factor (%) | Reflectivity (%) | Modulation factor (%) | Reflectivity (%) | Modulation factor (%) |
| Ex. 20 | 69 | 64 | 65 | 60 | 68 | 63 |
| Ex. 21 | 65 | 65 | 62 | 61 | 64 | 63 |
| Ex. 22 | 65 | 64 | 63 | 60 | 64 | 63 |
| Ex. 23 | 68 | 62 | 66 | 60 | 67 | 63 |
| Ex. 24 | 66 | 65 | 63 | 62 | 65 | 64 |
| Ex. 25 | 69 | 66 | 65 | 61 | 68 | 64 |
| Ex. 26 | 65 | 62 | 62 | 58 | 63 | 61 |
| Ex. 27 | 68 | 65 | 63 | 60 | 67 | 64 |
| Ex. 28 | 68 | 62 | 62 | 57 | 66 | 60 |
| Ex. 29 | 64 | 63 | 60 | 58 | 63 | 61 |
| Ex. 30 | 70 | 67 | 67 | 64 | 70 | 65 |
| Ex. 31 | 68 | 64 | 65 | 61 | 67 | 63 |
| Ex. 32 | 67 | 63 | 63 | 59 | 67 | 62 |
| Ex. 33 | 66 | 64 | 62 | 61 | 65 | 63 |
| Ex. 34 | 65 | 65 | 62 | 62 | 64 | 63 |

Example 35

A coating liquid in which a mixture of the compound having 10 formula (14) and a compound No. 88 in a ratio of 1:1 by weight was dissolved in a mixed solvent of methylcyclohexane, 2-methoxyethanol, methyl ethyl ketone and tetrahydrofuran was coated by a spin coating method on a polycarbonate substrate of 1.2 mm in thickness which had been prepared by injection molding and which had guide grooves having a depth of 1500 Å, a half width of 0.40 μm, and a track pitch of 1.1 μm. Thus, an organic dye layer having a thickness of 1700 Å was formed on the substrate. Then a light reflective gold layer having a thickness of 2000 Å was formed thereon by a sputtering method, and further thereon a protective layer having a thickness of 5 μm was formed by coating an acrylic photo-polymer.

Thus, an optical recording medium of the present invention was prepared.

Examples 36 and 37

The procedure for preparation of the optical recording medium in Example 35 was repeated except that compound No. 88 was replaced with a compound No. 89 or 90.

Thus, optical recording media of the present invention were prepared.

Examples 38 and 39

The procedure for preparation of the optical recording medium in Example 35 was repeated except that compound No. 88 was replaced with a compound No. 91 or 92 while the compound having formula (14) was replaced with the compound having formula (15).

Thus, optical recording media of the present invention were prepared.

Each of the optical recording media of Examples 35–39 was evaluated with respect to reflectivity and C/N ratio. In addition, reflectivity and C/N ratio were also measured after a light irradiation test or a preservation test.

(1) Recording Conditions

EFM signals were recorded at a linear speed of 1.4 m/sec using laser light of a laser diode having a wavelength of 780 nm and a beam diameter of 1.6 μm while tracking. The signals were reproduced with the laser light used for recording, or continuous light of a laser diode having a wavelength of 650 nm, and a beam diameter of 1.0 μm. The waveform of the reproduced signals was observed.

The results are shown in Table 9.

TABLE 9

|  | Laser having wavelength of 780 nm | | Laser having wavelength of 650 nm | |
|---|---|---|---|---|
|  | Reflectivity (%) | Waveform | Reflectivity (%) | Waveform |
| Ex. 35 | 71 | Clear | 25 | Clear |
| Ex. 36 | 72 | Clear | 27 | Clear |
| Ex. 37 | 68 | Clear | 24 | Clear |
| Ex. 38 | 71 | Clear | 24 | Clear |
| Ex. 39 | 68 | Clear | 25 | Clear |

Example 40

A methyl cellosolve solution of a compound No. 76 was coated by a spin coating method on a polycarbonate substrate of 0.6 mm in thickness which had been prepared by injection molding and in which guide grooves having a depth of 1600 Å, a half width of 0.35 μm and a track pitch of 1.0 μm had been formed by coating a photo-polymer.

Thus, an optical recording medium of the present invention was prepared.

Examples 41–45

The procedure for preparation of the optical recording medium in Example 40 was repeated except that compound No. 76 was replaced with each of compounds Nos. 77–81.

Thus optical recording media of the present invention were prepared.

Comparative Example 7

The procedure for preparation of the optical recording medium in Example 40 was repeated except that compound No. 76 was replaced with the compound having formula (14).

Thus a comparative optical recording medium was prepared.

Each of the optical recording media of Examples 40 to 45 and Comparative Example 7 was evaluated with respect to reflectivity and C/N ratio. In addition, reflectivity and C/N ratio were also measured after a light irradiation test and a preservation test. The recording and reproducing conditions are as follows:
(1) Recording Conditions
   Wavelength of oscillated laser: 635 nm
   Frequency in recording: 1.25 MHz
   Linear speed in recording: 3.0 m/sec
(2) Reproducing Conditions
   Wavelength of oscillated laser: 650 nm
   Reproduction power: 0.6 to 0.9 mW (continuous light)
   Scanning band width: 30 kHz
(3) Light Irradiation Test
   Xenon light of 40,000 Lux irradiated each optical recording medium for 20 hours.
(4) Preservation Test
   Each optical recording medium was preserved for 500 hours under conditions of 85° C. in temperature and 85% in relative humidity.

The results are shown in Table 10.

TABLE 10

|  | Initial value | | After light irradiation test | | After preservation test | |
| --- | --- | --- | --- | --- | --- | --- |
|  | Reflectivity (%) | C/N ratio (db) | Reflectivity (%) | C/N ratio (db) | Reflectivity (%) | C/N ratio (db) |
| Ex. 40 | 25 | 52 | 23 | 50 | 24 | 51 |
| EX. 41 | 24 | 51 | 22 | 49 | 23 | 50 |
| Ex. 42 | 24 | 50 | 21 | 49 | 23 | 49 |
| Ex. 43 | 26 | 51 | 23 | 48 | 25 | 49 |
| Ex. 44 | 25 | 50 | 23 | 48 | 24 | 48 |
| Ex. 45 | 24 | 51 | 22 | 48 | 23 | 49 |
| Comp. Ex. 7 | 11 | not measurable | 7 | not measurable | 9 | not measurable |

Example 46

A coating liquid in which a compound No. 82 was dissolved in a mixed solvent of methylcyclohexane, 2-methoxyethanol, and methyl ethyl ketone was coated by a spin coating method on an injection-molded polycarbonate substrate of 0.6 mm in thickness which had been prepared by injection molding and which had guide grooves having a depth of 1400 Å, a half width of 0.35 μm, and a track pitch of 1.0 μm. Thus, an organic dye layer having a thickness of 800 Å was formed on the substrate. Then a light reflective gold layer having a thickness of 1500 Å was formed thereon by a sputtering method, and further thereon a protective layer having a thickness of 5 μm was formed by coating an acrylic photo-polymer.

Thus, an optical recording medium of the present invention was prepared.

Examples 47–51

The procedure for preparation of the optical recording medium in Example 46 was repeated except that compound No. 82 was replaced with a compound No. 83, 84, 85, 86 or 87.

Thus, optical recording media of the present invention were prepared.

Comparative Example 8

The procedure for preparation of the optical recording medium in Example 46 was repeated except that compound No. 82 was replaced with the compound having formula (14).

Thus, a comparative optical recording media was prepared.

Each of the optical recording media of Examples 46 to 51 and Comparative Example 8 was evaluated with respect to reflectivity and reproduced waveform.

Recording and reproducing were performed as follows:
EFM signals were recorded at a linear speed of 3.0 m/sec using laser light having a wavelength of 635 nm and a beam diameter of 1.0 μm while tracking (the length of the shortest mark was 0.4 μm). The signals were reproduced with continuous light of a laser diode having a wavelength of 650 nm and a power of 0.7mW. The waveform of the reproduced signals was observed.

The results are shown in Table 11.

TABLE 11

|  | Initial value | | After light irradiation test | |
| --- | --- | --- | --- | --- |
|  | Reflectivity (%) | waveform | Reflectivity (%) | waveform |
| Ex. 46 | 70 | Clear | 65 | Clear |
| Ex. 47 | 71 | Clear | 65 | Clear |
| Ex. 48 | 72 | Clear | 64 | Clear |
| Ex. 49 | 70 | Clear | 63 | Clear |
| Ex. 50 | 69 | Clear | 65 | Clear |
| Ex. 51 | 69 | Clear | 64 | Clear |
| Comp. Ex. 8 | 5 | not measurable | 5 | not measurable |

Example 52

A coating liquid in which a mixture of the compound having formula (14) and a compound No. 88 in a ratio of 1:1 by weight was dissolved in a mixed solvent of methylcyclohexane, 2-methoxyethanol, methyl ethyl ketone and tetrahydrofuran was coated by a spin coating method on a polycarbonate substrate of 1.2 mm in thickness which had been prepared by injection molding and which had guide grooves having a depth of 1500 Å, a half width of 0.40 μm, and a track pitch of 1.1 μm. Thus, an organic dye layer having a thickness of 1700 Å was formed on the substrate. Then a light reflective gold layer having a thickness of 2000 Å was formed thereon by a sputtering method, and further thereon a protective layer having a thickness of 5 μm was formed by coating an acrylic photo-polymer.

Thus, an optical recording medium of the present invention was prepared.

Examples 53 and 54

The procedure for preparation of the optical recording medium in Example 52 was repeated except that compound No. 88 was replaced with a compound No. 89 or 90.

Thus, optical recording media of the present invention were prepared.

Examples 55 and 56

The procedure for preparation of the optical recording medium in Example 52 was repeated except that compound No. 88 was replaced with a compound No. 91 or 92 while the compound having formula (14) was replaced with the compound having formula (15).

Thus, optical recording media of the present invention were prepared.

Comparative Examples 9 and 10

The procedure for preparation of the optical recording medium in Example 52 was repeated except that the mixture was replaced with only the compound having formula (14) or the compound having formula (15).

Thus, comparative optical recording media were prepared.

EFM signals were recorded in each optical recording medium of Examples 52–56 and Comparative Examples 9–10 at a linear speed of 1.4 m/sec using laser light of a laser diode having a wavelength of 780 nm and a beam diameter of 1.6 μm while tracking. The signals were reproduced with continuous light of a laser diode having a wavelength of 650 nm and a beam diameter of 1.0 μm. The waveform of the reproduced signals was observed.

The results are shown in Table 12.

TABLE 12

| | Laser having wavelength of 780 nm | | Laser having wavelength of 650 nm | |
|---|---|---|---|---|
| | Reflectivity (%) | waveform | Reflectivity (%) | waveform |
| Ex. 52 | 71 | Clear | 25 | Clear |
| Ex. 53 | 72 | Clear | 27 | Clear |
| Ex. 54 | 68 | Clear | 24 | Clear |
| Ex. 55 | 71 | Clear | 24 | Clear |
| Ex. 56 | 68 | Clear | 25 | Clear |
| Comp. Ex. 9 | 72 | Clear | 5 | not reproducible |
| Comp. Ex. 10 | 70 | Clear | 5 | not reproducible |

As can be understood from Tables, the optical recording media of the present invention can record and reproduce information with laser light having a wavelength in a range of from 630 to 700 nm, and have good light resistance and good preservation stability.

In addition, the optical recording medium can be used not only as a CD-R useful for the current systems, but also as a recording medium for the next-generation optical disc systems. Further the optical recording medium of the present invention can also be used as a DVD-R medium, and the information which has been recorded in the optical recording medium of the present invention using a current CD-R system can be reproduced with a high-density recording system.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Applications Nos. 10-247867 and 11-170708, filed on Aug. 18, 1998 and Jun. 17, 1999, respectively, the entire contents of which are herein incorporated by reference.

What is claimed is:

1. An optical recording material comprising a substrate and a recording layer which is formed overlying the substrate, wherein the recording layer comprises an azo chelate compound comprising an azo compound and at least one of a metal and a metal salt and wherein the azo compound has the following formula (1):

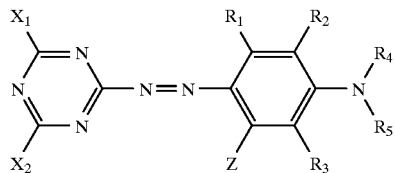

(1)

wherein R1, R2 and R3 independently represent a hydrogen atom, a halogen atom, a nitro group, a cyano group, a hydroxy group, a carboxyl group, an amino group, a carbamoyl group, an alkyl group which may be substituted, an aryl group which may be substituted, a heterocyclic group which may be substituted, an alkyloxy group which may be substituted, an aryloxy group which may be substituted, an alkylamino group which may be substituted, an arylamino group which may be substituted, an alkyloxycarbonyl group which may be substituted, an aryloxycarbonyl group which may be substituted, an alkylcarbonylamino group which may be substituted, an arylcarbonylamino group which may be substituted, an alkylcarbamoyl group which may be substituted, an arylcarbamoyl group which may be substituted or an alkenyl group which may be substituted; R4 and R5 independently represent a hydrogen atom, an alkyl group which may be substituted or an aryl group which may be substituted, wherein R1 and R2, R2 and R4, R2 and R5, R3 and R4, R3 and R5, and R4 and R5 may combine to form a ring; X1 represents a group of R6 or SR7, wherein R6 represents a hydrogen atom, a halogen atom, a nitro group, a cyano group, a hydroxy group, a carboxyl group, an alkyl group which may be substituted, a phenyl group which may be substituted, an alkoxy group which may be substituted, an aryloxy group which may be substituted, a carbamoyl group which may be substituted, an acyl group which may be substituted, an alkoxycarbonyl group which may be substituted, an aryloxycarbonyl group which may be substituted, an alkenyl group which may be substituted or an amino group which may be substituted, and R7 represents a hydrogen atom, an alkyl group which may be substituted, or an aryl group which may be substituted; X2 represents a group of R8, SR9, OR10 or NR11R12, wherein R8 represents the same groups as mentioned above for use as R6, R9 represents an alkyl group which may be substituted, and R10, R11 and R12 independently represent an alkyl group which may be substituted or an aryl group which may be substituted; and Z represents a group having active hydrogen.

2. The optical recording medium according to claim 1, wherein Z is a group selected from the group consisting of a hydroxy group and its derivatives, a carboxyl group and its derivatives, an amino group and its derivatives, a sulfo group and its derivatives, an amide group NHX3 in which X3 represents COR13 in which R13 represents an alkyl group which may be substituted or an aryl group which may be substituted, and a sulfonamide group NHX4 in which X4 represents a group of $SO_2R14$ in which R14 represents an alkyl group which may be substituted or an aryl group which may be substituted.

3. The optical recording medium according to claim 1, wherein the azo compound comprises a compound having the following formula (2):

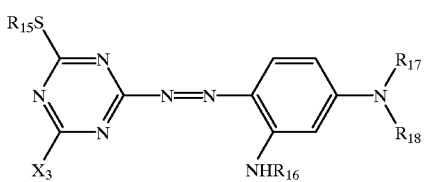

(2)

wherein R15 represents a phenyl group which may be substituted; R17 and R18 independently represent a hydrogen atom, an alkyl group having 1 to 6 carbon atoms which may be substituted or a phenyl group which may be substituted, wherein R17 and R18 may combine to form a ring; X3 represents a group of OR19 or NR20R21, wherein R19, R20 and R21 independently represent an alkyl group having 1 to 6 carbon atoms which may be substituted or a phenyl group which may be substituted; and R16 represents a group of COR22 or $SO_2R23$, wherein R22 and R23 independently represent an alkyl group which may be substituted or an aryl group which may be substituted.

4. The optical recording medium according to claim 1, wherein the azo compound comprises a compound having the following formula (3):

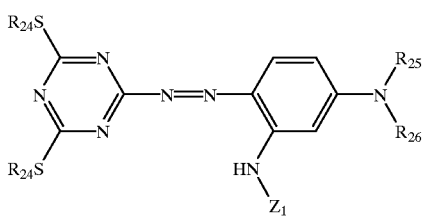

(3)

wherein R24 represents an alkyl group which may be substituted or a phenyl group which may be substituted; R25 and R26 independently represent a hydrogen atom, an alkyl group which may be substituted or an aryl group which may be substituted, wherein R25 and R26 may combine to form a ring; and Z1 represents a group of COR27 or $SO_2R28$, wherein R27 and R28 independently represent an alkyl group which may be substituted or an aryl group which may be substituted.

5. The optical recording medium according to claim 1, wherein the metal comprises a metal selected from the group consisting of manganese, chromium, iron, cobalt, nickel and copper.

6. The optical recording medium according to claim 1, wherein the recording layer has a refractive index n of from about 1.5 to about 3.0 and an extinction coefficient k of from about 0.02 to about 0.2 when the refractive index and the extinction coefficient are measured with respect to only the recording layer using light having a wavelength within ±5 nm of a wavelength of light used for reproduction.

7. The optical recording medium according to claim 1, wherein the azo chelate compound has a property such that a slope of a weight decreasing curve is greater than about 2%/° C. during a main weight decreasing process when the azo chelate compound is subjected to a thermogravimetry analysis.

8. The optical recording medium according to claim 1, wherein the azo chelate compound has a property such that total weight loss of the azo chelate compound during a main weight decreasing process is not less than about 30% and a weight decrease starting temperature is not higher than about 350° C. when the azo chelate compound is subjected to a thermogravimetry analysis.

9. The optical recording medium according to claim 1, wherein the substrate has guide grooves having a track pitch of from about 0.7 to about 0.8 $\mu$m and a half width of from about 0.18 to about 0.36 $\mu$m.

10. The optical recording medium according to claim 1, wherein the recording layer further comprises a dye having maximum absorption in a wavelength range of from about 680 to about 750 nm.

11. The optical recording medium according to claim 10, wherein the dye having maximum absorption in a wavelength range of from about 680 to about 750 nm comprises a cyanine dye, a phthalocyanine dye or an azo metal chelate compound.

12. The optical recording medium according to claim 1, wherein the optical recording medium further comprises a light reflective layer, and wherein the light reflective layer comprises a metal selected from the group consisting of gold, gold alloys, silver, silver alloys, aluminum and aluminum alloys.

13. An optical information recording and reproducing method comprising the steps of:

providing an optical recording medium comprising a substrate and a recording layer which is formed overlying the substrate, wherein the recording layer comprises an azo metal chelate compound comprising an azo compound and a metal or a metal salt, and wherein the azo compound has the following formula (1):

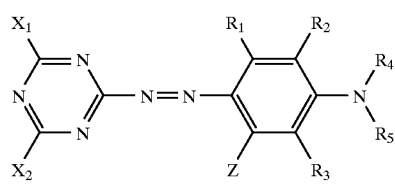

(1)

wherein R1, R2 and R3 independently represent a hydrogen atom, a halogen atom, a nitro group, a cyano group, a hydroxy group, a carboxyl group, an amino group, a carbamoyl group, an alkyl group which may be substituted, an aryl group which may be substituted, a heterocyclic group which may be substituted, an alkyloxy group which may be substituted, an aryloxy group which may be substituted, an alkylamino group which may be substituted, an arylamino group which may be substituted, an alkyloxycarbonyl group which may be substituted, an aryloxycarbonyl group which may be substituted, an alkylcarbonylamino group which may be substituted, an arylcarbonylamino group which may be substituted, an alkylcarbamoyl group which may be substituted, an arylcarbamoyl group which may be substituted or an alkenyl group which may be substituted; R4 and R5 independently represent a hydrogen atom, an alkyl group which may be substituted or an aryl group which may be substituted, wherein R1 and R2, R2 and R4, R2 and R5, R3 and R4, R3 and R5, and R4 and R5 may combine to form a ring; X1 represents a group of R6 or SR7, wherein R6 represents a hydrogen atom, a halogen atom, a nitro group, a cyano group, a hydroxy group, a carboxyl group, an alkyl group which may be substituted, a phenyl group which may be substituted, an alkoxy group which may be substituted, an aryloxy group which may be substituted, a carbamoyl group which may be substituted, an acyl group which may be substituted, an alkoxycarbonyl group which may be substituted, an aryloxycarbonyl group which may be substituted, an alkenyl group which may be substituted or an amino group which may be substituted, and R7 represents a hydrogen atom, an alkyl group which may be substituted, or an aryl group which may be substituted; X2 represents a group of R8, SR9, OR10 or NR11R12, wherein R8 represents the same groups as mentioned above for use as R6, R9 represents an alkyl group which may be substituted, and R10, R11 and R12 independently represent an alkyl group which may be substituted or an aryl group which may be substituted; and Z represents a group having active hydrogen;

irradiating the optical recording medium with laser light to record information in the optical recording medium; and irradiating the optical recording medium, in which information is recorded, with laser light which may be different from or the same as said first-mentioned laser light to reproduce the information, wherein the first-mentioned laser light and the second-mentioned laser light have a wavelength of from about 630 to about 690 nm.

14. The optical information recording and reproducing method according to claim 13, wherein the recording layer has a refractive index n of from about 1.5 to about 3.0 and an extinction coefficient k of from about 0.02 to about 0.2 when the refractive index and the extinction coefficient are measured with respect to only the recording layer using light having a wavelength within ±5 nm of a wavelength of said second-mentioned laser light.

15. An optical information recording and reproducing method comprising the steps of:

providing an optical recording medium comprising a substrate and a recording layer which is formed overlying the substrate, wherein the recording layer comprises a dye having maximum absorption in a wavelength range of from about 680 to about 750 nm, and an azo metal chelate compound comprising an azo compound and a metal or a metal salt, and wherein the azo compound has the following formula (1):

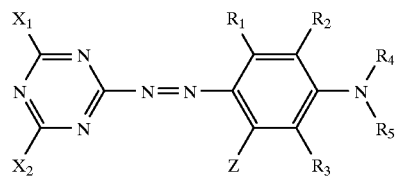

(1)

wherein R1, R2 and R3 independently represent a hydrogen atom, a halogen atom, a nitro group, a cyano group, a hydroxy group, a carboxyl group, an amino group, a carbamoyl group, an alkyl group which may be substituted, an aryl group which may be substituted, a heterocyclic group which may be substituted, an alkyloxy group which may be substituted, an aryloxy group which may be substituted, an alkylamino group which may be substituted, an arylamino group which may be substituted, an alkyloxycarbonyl group which may be substituted, an aryloxycarbonyl group which may be substituted, an alkylcarbonylamino group which may be substituted, an arylcarbonylamino group which may be substituted, an alkylcarbamoyl group which may be substituted, an arylcarbamoyl group which may be substituted or an alkenyl group which may be substituted; R4 and R5 independently represent a hydrogen atom, an alkyl group which may be substituted or an aryl group which may be substituted, wherein R1 and R2, R2 and R4, R2 and R5, R3 and R4, R3 and R5, and R4 and R5 may combine to form a ring; X1 represents a group of R6 or SR7, wherein R6 represents a hydrogen atom, a halogen atom, a nitro group, a cyano group, a hydroxy group, a carboxyl group, an alkyl group which may be substituted, a phenyl group which may be substituted, an alkoxy group which may be substituted, an aryloxy group which may be substituted, a carbamoyl group which may be substituted, an acyl group which may be substituted, an alkoxycarbonyl group which may be substituted, an aryloxycarbonyl group which may be substituted, an alkenyl group which may be substituted or an amino group which may be substituted, and R7 represents a hydrogen atom, an alkyl group which may be substituted, or an aryl group which may be substituted; X2 represents a group of R8, SR9, OR10 or NR11R12, wherein R8 represents the same groups as mentioned above for use as R6, R9 represents an alkyl group which may be substituted, and R10, R11 and R12 independently represent an alkyl group which may be substituted or an aryl group which may be substituted; and Z represents a group having active hydrogen;

irradiating the optical recording medium with laser light to record information in the optical recording medium; and irradiating the optical recording medium, in which information is recorded, with laser light which may be different from or the same as said first-mentioned laser light to reproduce the information, wherein the first-mentioned laser light has a wavelength of from about 770 to about 810 nm, and the second-mentioned laser light has a wavelength of from about 630 to about 690 nm or from about 770 to about 810 nm.

16. The optical information recording and reproducing method according to claim 15, wherein the recording layer has a refractive index n of from about 1.5 to about 3.0 and an extinction coefficient k of from about 0.02 to about 0.2 when the refractive index and the extinction coefficient are measured with respect to only the recording layer using light having a wavelength within ±5 nm of a wavelength of said second-mentioned laser light.

* * * * *